(12) United States Patent
Shoji et al.

(10) Patent No.: US 6,188,656 B1
(45) Date of Patent: *Feb. 13, 2001

(54) OPTICAL DATA RECORDING METHOD, AND DATA RECORDING MEDIUM

(75) Inventors: Mamoru Shoji, Sakai; Takashi Ishida, Yawata; Atsushi Nakamura, Kadoma, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 30 days.

(21) Appl. No.: 09/352,211

(22) Filed: Jul. 13, 1999

(30) Foreign Application Priority Data

Sep. 14, 1998 (JP) .................................................. 10-259908
Dec. 9, 1998 (JP) .................................................. 10-350100

(51) Int. Cl.[7] .......................... G11B 7/0045; G11B 7/0037

(52) U.S. Cl. .............................................. 369/48; 369/59

(58) Field of Search ........................... 369/47–48, 54, 369/58, 59

(56) References Cited

U.S. PATENT DOCUMENTS

| | | | |
|---|---|---|---|
| 5,490,126 | 2/1996 | Furumiya et al. | 369/59 |
| 5,499,227 | 3/1996 | Higasa | 369/59 |
| 5,513,165 | 4/1996 | Ide et al. . | |
| 5,517,481 | * 5/1996 | Kobayashi | 369/59 X |
| 5,590,111 | 12/1996 | Kirino et al. . | |
| 5,615,193 | * 3/1997 | Kobayashi et al. | 369/59 |
| 5,636,194 | 6/1997 | Furumiya et al. | 369/59 |
| 5,642,343 | 6/1997 | Toda et al. . | |
| 5,732,061 | 3/1998 | Kirino et al. . | |

FOREIGN PATENT DOCUMENTS

| | | |
|---|---|---|
| 0 477 892 | 4/1992 | (EP) . |
| 0 552 936 | 7/1993 | (EP) . |
| 0 749 114 | 12/1996 | (EP) . |
| 0 797 193 | 9/1997 | (EP) . |
| 0 978 827 A2 | 2/2000 | (EP) . |
| 63-121130 | 5/1988 | (JP) . |
| 2-005221 | 1/1990 | (JP) . |
| 4-265522 | 9/1992 | (JP) . |
| 5-062191 | 3/1993 | (JP) . |
| 5-135363 | 6/1993 | (JP) . |
| 5-159298 | 6/1993 | (JP) . |
| 5-290437 | 11/1993 | (JP) . |
| 7-037250 | 2/1995 | (JP) . |
| 7-129959 | 5/1995 | (JP) . |
| 8-287465 | 11/1996 | (JP) . |
| 2679596 | 8/1997 | (JP) . |
| 97/14143 | 4/1997 | (WO) . |

OTHER PUBLICATIONS

ECMA/TC31/97/147, ECMA Standardizing Information and Communication Systems, published Dec. 1997.
JIS X 6243: 1998, 120mm DVD Rewritable–type disk (DVD–RAM) publication.

* cited by examiner

Primary Examiner—W. R. Young
(74) Attorney, Agent, or Firm—Wenderoth, Lind, & Ponack, L.L.P.

(57) ABSTRACT

An optical disc has a plurality of tracks for recording information represented as marks and spaces between the marks. The marks are formed by an optical beam modulated by a plurality of drive pulses where a number of the drive pulses is determined according to a length of a mark part in the original signal to be recorded to the track. The optical disc has a data recording area for recording data, and a control information recording area for storing a first pulse position Tu value indicative of rising edge of the first drive pulse for determining a start position of a mark to be recorded, and a last pulse position Td value indicative of falling edge of the last drive pulse for determining an end position of a mark to be recorded.

30 Claims, 25 Drawing Sheets

Fig. 4A

FIRST PULSE MOVEMENT (TF)

PRECEDING SPACE SIGNAL

| | | MARK SIGNAL | |
|---|---|---|---|
| | 3T | 4T | ≧5T |
| 3T | 3S3M | 3S4M | 3S5M |
| 4T | 4S3M | 4S4M | 4S5M |
| ≧5T | 5S3M | 5S4M | 5S5M |

LAST PULSE MOVEMENT (TL)

FOLLOWING SPACE SIGNAL

| | | MARK SIGNAL | |
|---|---|---|---|
| | 3T | 4T | ≧5T |
| 3T | 3M3S | 4M3S | 5M3S |
| 4T | 3M4S | 4M4S | 5M4S |
| ≧5T | 3M5S | 4M5S | 5M5S |

Fig. 4B

FIRST PULSE MOVEMENT (TF)

PRECEDING SPACE SIGNAL

| | | MARK SIGNAL | |
|---|---|---|---|
| | 3T | 4T | ≧5T |
| 3T | 3S3M0 | 3S4M0 | 3S5M0 |
| 4T | 4S3M0 | 4S4M0 | 4S5M0 |
| ≧5T | 5S3M0 | 5S4M0 | 5S5M0 |

LAST PULSE MOVEMENT (TL)

FOLLOWING SPACE SIGNAL

| | | MARK SIGNAL | |
|---|---|---|---|
| | 3T | 4T | ≧5T |
| 3T | 3M3S0 | 4M3S0 | 5M3S0 |
| 4T | 3M4S0 | 4M4S0 | 5M4S0 |
| ≧5T | 3M5S0 | 4M5S0 | 5M5S0 |

Fig. 19

LAST PULSE MOVEMENT (TL)

| | | MARK SIGNAL | | |
|---|---|---|---|---|
| | | 3T | 4T | ≥5T |
| FOLLOWING SPACE SIGNAL | 3T | 3M3S | 4M3S | 5M3S |
| | 4T | 3M4S | 4M4S | 5M4S |
| | ≥5T | 3M5S | 4M5S | 5M5S |

FIRST PULSE MOVEMENT (TF)

| | | MARK SIGNAL | | |
|---|---|---|---|---|
| | | 3T | 4T | ≥5T |
| PRECEDING SPACE SIGNAL | 3T | 3S3M | 3S4M | 3S5M |
| | 4T | 4S3M | 4S4M | 4S5M |
| | ≥5T | 5S3M | 5S4M | 5S5M |

Fig.24

First Pulse Movement (TF) / Mark Signal

| Preceding Space Signal | 3T | 4T | 5T | ≥6T |
|---|---|---|---|---|
| 3T | 3S3M | 3S4M | 3S5M | 3S6M |
| 4T | 4S3M | 4S4M | 4S5M | 4S6M |
| 5T | 5S3M | 5S4M | 5S5M | 5S6M |
| ≥6T | 6S3M | 6S4M | 6S5M | 6S6M |

Last Pulse Movement (TL) / Mark Signal

| Following Space Signal | 3T | 4T | 5T | ≥6T |
|---|---|---|---|---|
| 3T | 3M3S | 3M4S | 3M5S | 3M6S |
| 4T | 4M3S | 4M4S | 4M5S | 4M6S |
| 5T | 5M3S | 5M4S | 5M5S | 5M6S |
| ≥6T | 6M3S | 6M4S | 6M5S | 6M6S |

OPTICAL DATA RECORDING METHOD, AND DATA RECORDING MEDIUM

BACKGROUND OF THE INVENTION

1. Field of the Invention

The present invention relates to a recording method for recording optical data to a writable data recording medium, and to the structure of a data recording medium used by this method.

2. Description of the Related Art

Devices for recording and reproducing optical data, particularly digital data, to data recording media have been the subject of much development due to the ability of such devices to store large volumes of data using media of a given physical size.

The phase change optical disk is one type of recordable optical data recording medium. To record to a phase change optical disk, the beam from a semiconductor laser is focused on the rotating disk to heat and melt, that is, change the phase of, a recording film. The temperature of the recording film and the rate at which the film cools vary, for example, according to the intensity of the optical beam.

When the intensity of the optical beam is high, the film cools rapidly from a high temperature state, and the recording film is changed to an amorphous phase. When the optical beam is relatively weak, the recording film cools gradually from a medium-high temperature state, and the recording film thus crystallizes. The resulting amorphous areas of the recording film are normally referred to as a "mark" and the crystallized part between consecutive marks is normally referred to as a "space." These marks and spaces can be used to record two-value data, that is, 0s and 1s.

It is also to be noted that laser power, when the optical beam intensity is high, is referred to as "peak power," and laser power, when the optical beam intensity is low, is referred to as "bias power."

When reproducing data, a low power optical beam, that is, a light beam not strong enough to produce a phase change in the recording film, is emitted to the disk, and the light reflected back from the disk is then detected. In general, the reflectance of the amorphous phase marks is low, and the reflectance of crystal phase spaces is high. A reproduction signal can therefore be obtained by detecting the difference in the amount of light reflected from the marks and spaces.

Mark position recording (or PPM recording) whereby information is recorded using the location of marks of a constant length, and mark edge recording (or PWM recording) whereby information is recorded using the length of the marks and the length of spaces between marks, are two methods of recording data to a phase change optical disk. The data recording density of mark edge recording is generally the higher of these two methods.

The mark edge recording method also generally records longer marks compared with the constant mark length in mark position recording. When a peak power laser beam is emitted to a phase change disk to record a long mark, heat accumulation in the recording film produces marks that are wider in the latter half of the mark as seen in the radial direction, something like a teardrop shape. Such marks significantly degrade signal quality, causing, for example, degraded signal linearity in the recorded signal, increased jitter during reproduction, mark remnants that are left when the marks are overwritten by direct overwrite recording, and signal crosstalk between tracks during reproduction.

Recording shorter marks and spaces is one means of increasing the recording density. A short space length, however, can result in thermal interference. For example, heat at the trailing end of a recorded mark is transferred through the following space, which can then contribute to a temperature increase at the beginning of the following mark. Heat at the beginning end of one recorded mark can also transfer through the preceding space and affect the cooling process at the end of the preceding mark. A problem with thermal interference in conventional recording methods is that mark edge positions will vary, causing a higher error rate during reproduction.

To address the above-noted problems, Japanese Unexamined Patent Application Publication (kokai) 7-129959 (U.S. Pat. Nos. 5,490,126 and 5,636,194) teach a method for recording marks by segmenting that part of the recording signal corresponding to a mark in mark edge recording into start, middle, and end parts, the start and end parts each having a constant pulse width and the middle containing pulses of a constant period. This recording signal is then used to rapidly switch the output of a two-value laser.

With this method, the width of the middle part of a long mark is substantially constant and does not spread because laser output is driven with a constant period pulse current producing the minimum power required for mark formation. An increase in jitter at the leading and trailing edges of the mark can also be suppressed during direct overwrite recording because the laser beam is emitted with a constant pulse width at the leading and trailing ends of the mark.

It is also possible to detect whether marks, or spaces before and after a mark, are long or short, and change the position at which the start and end parts of a mark are recorded according to the length of the mark and the leading and trailing spaces. This makes it possible to compensate during recording for peak shifts caused by thermal interference whereby heat at the end of a recorded mark transfers through the following space and affects the heating process at the beginning of the next mark, and heat at the beginning of a next recorded mark conversely travels back through the preceding space and affects the cooling process at the end of the preceding mark.

The publication kokai 7-129959 does not, however, teach a method for determining the optimum positions of the start and end parts of a mark, nor does it teach a specific structure and basis for changing or adjusting the start and end edge positions.

If such an optimum method and structure are not defined, the reliability of optimized recording will be low. Furthermore, even if optimized recording is achieved, it will be at the expense of excessive time spent searching for the optimum position and excessive circuit cost.

A method for changing the start and end edge positions of a mark based on the data being recorded has been invented as a means of achieving high density data recording. A problem with this method, however, is that the edge of a recorded mark can move due to thermal interference as described above. This edge movement phenomenon is also highly dependent upon the disk structure and the composition of the recording film, and if either of these change even slightly, optimized recording cannot be achieved.

SUMMARY OF THE INVENTION

With consideration for the above described problems, an object of the present invention is therefore to provide a method for determining the optimum position of mark start and mark end parts.

A further object of the present invention is to provide a data recording medium wherewith optimized recording is possible even with disks of different types, including disk structure and recording film composition.

To achieve the above objects, a data recording medium according to the present invention has a plurality of tracks to which data is recorded by controlling the lengths of marks and spaces remaining between consecutive marks. The marks are formed by changing the optical characteristics of the recording film in the track recording surface. More specifically, a mark start position Td and mark end position Td are varied according to an input signal so that playback signal jitter is a predetermined constant value or less, and one or both of these adjusted start position Td and end position Td values, or a typical value therefor, and the method for using these Td and adjusted start position and end position values, are prerecorded to a predetermined location on the data recording medium.

In a data recording medium according to the present invention, the mark start position can be determined based on the length of the mark part of a recording signal and the space part immediately preceding the mark part. The mark end position can be similarly determined from the length of a mark part and the immediately following space part of a recording signal.

A data recording medium according to a first aspect of the present invention having a plurality of tracks for recording information represented as marks and spaces between the marks, the marks being formed by emitting to a track in the data recording medium an optical beam modulated by one or a plurality of drive pulses where a number of the drive pulses is adjusted according to a length of a mark part in the original signal to be recorded to the track, comprises: a data recording area for recording data, and a control information recording area for storing at least one of a first pulse position Tu value for determining a start position of a mark to be recorded, and a last pulse position Td value for determining an end position of a mark to be recorded.

It is therefore possible to achieve recording optimized for specific differences in disk structure and/or recording film composition by reproducing these adjustment values Td and Td and using them to generate an optimized recording signal from which the marks and spaces are formed.

A data recording medium according to a second aspect of the present invention more specifically determines the first pulse position Tu from the length of a mark part and the immediately preceding space part in the original signal, and determines the last pulse position Td from the length of a mark part and the immediately following space part in the original signal.

It is therefore possible to compensate during recording for the effects of heat accumulation and thermal interference during recording, and for equalizer distortion during reproduction, to achieve recording with little jitter.

A data recording medium according to a third aspect of the present invention yet further expresses the first pulse position Tu as a time difference TF between a first reference point R1, which is a leading edge of a mark part in the original signal to be recorded, and a first edge of the first pulse in a plurality of drive pulses, and expresses the last pulse position Td as a time difference TL between a second reference point R2, which has a specific known position relative to a trailing edge of a mark part in the original signal to be recorded, and a trailing edge of the last pulse in a plurality of drive pulses.

It is therefore possible to obtain mark start position and mark end position more accurately.

In a data recording medium according to a fourth aspect of the present invention, the length of mark parts in the original signal and the length of space parts between the mark parts are further specifically expressed as a value NT where T is a reference period, and N is a positive integer from n1 to n2. Mark and space parts are further separated into a plurality of groups used for mark start and end position adjustment according to mark and space length; and specific first pulse position Tu and last pulse position Td values are set for each adjustment group.

Circuit scale can therefore be reduced by combining a plurality of mark lengths and space lengths into a single group. Recording with even less jitter can also be achieved by reducing the number of mark lengths and space lengths in the group as the mark and space length decreases, and thus increasing the number of groups as mark and space length decreases.

A data recording medium according to a fifth aspect of the present invention further specifically separates mark parts by length into three groups, and separates space parts by length into three groups.

A data recording medium according to a sixth aspect of the present invention yet further separates mark parts by length into four groups, and separates space parts by length into four groups.

Recording with less jitter can thus be achieved by even more precisely separating mark and space lengths and further increasing the number of adjustment groups.

A data recording medium according to a seventh aspect of the present invention increases the number of adjustment groups as a length of the mark part and a length of the space part decreases.

Shorter marks and spaces occur more frequently, and by using a signal with a high frequency of occurrence as the reference signal for adjusting mark position, it is possible to record with less jitter compared with using a signal with a low frequency of occurrence as the reference signal.

In a data recording medium according to an eighth aspect of the present invention n1 is 3 and n2 is 11.

In a data recording medium according to a ninth aspect of the present invention, mark parts are separated by length into three groups of 3T, 4T, and 5T or longer marks, and space parts are separated by length into three groups of 3T, 4T, and 5T or longer spaces.

In a data recording medium according to a tenth aspect of the present invention, mark parts are separated by length into four groups of 3T, 4T, 5T, and 6T or longer marks, and space parts are separated by length into three groups of 3T, 4T, 5T, and 6T or longer spaces.

In a data recording medium according to an eleventh aspect of the present invention, there are two or more methods of using Tu and Td with a plurality of pulses, and information indicative of the method of use is prerecorded to the control information recording area.

In a data recording medium according to a twelfth aspect of the present invention, the method of Tu use uses Tu to change the rising edge position of a first drive pulse without changing the width thereof, and the method of Td use uses Td to change the falling edge position of a last drive pulse without changing the width thereof.

In a data recording medium according to a thirteenth aspect of the present invention, the method of Tu use uses Tu to change the width of a first drive pulse without changing the falling edge position thereof, and the method of Td use uses Td to change the width of a last drive pulse without changing the rising edge position thereof.

In a data recording medium according to a fourteenth aspect of the present invention, the information indicative of the method of Tu and Td use is recorded to a position before the position where the Tu and Td values are recorded referenced to the direction in which information is recorded.

A fifteenth aspect of the present invention relates to a method for obtaining a first pulse position Tu for a data recording medium having a plurality of tracks, marks formed by emitting to a track in the data recording medium an optical beam modulated by one or a plurality of drive pulses where a number of the drive pulses is determined according to a length of a mark part in the original signal to be recorded to the track, a data recording area for recording information using the marks and spaces between the marks, and a control information recording area having recorded thereto at least a first pulse position Tu value and a last pulse position Td value whereby at least a first pulse position Tu and a last pulse position Td of the drive pulse is changed so as to make a reproduction jitter a specific value or less. This method comprises: generating a pattern signal containing a pattern of consecutive mark parts with a specific length of PT and space parts with a specific length of QT where T is a reference period, P is a positive integer from n1 to n2, and Q is a positive integer from n1 to n2; storing the pattern signal; generating a plurality of drive pulses from the pattern signal; forming spaces and marks on the data recording medium by generating and emitting thereto an optical beam modulated according to the plurality of drive pulses; reproducing the marks and spaces recorded to the data recording medium; comparing and obtaining a difference between a combination of mark and space parts in the reproduced reproduction signal, and a combination of mark and space parts in the stored pattern signal; and obtaining from this difference a first pulse position Tu for application to an original signal containing a sequence of space parts of length QT and mark parts of length PT.

More specifically according to a sixteenth aspect of the present invention, first pulse position Tu is obtained for a plurality of combinations of mark lengths and space lengths by changing the values of P and Q.

More specifically according to a seventeenth aspect of the present invention, the pattern signal contains an adjustment signal for obtaining a DSV of 0.

An eighteenth aspect of the present invention relates to a method for obtaining a last pulse position Td for a data recording medium having a plurality of tracks, marks formed by emitting to a track in the data recording medium an optical beam modulated by one or a plurality of drive pulses where a number of the drive pulses is determined according to a length of a mark part in the original signal to be recorded to the track, and a control information recording area for recording information using the marks and spaces between the marks, and having recorded thereto at least a first pulse position Tu value and a last pulse position Td value whereby at least a first pulse position Tu and a last pulse position Td of the drive pulse is changed so as to make a reproduction jitter a specific value or less. This method comprises: generating a pattern signal containing a pattern of consecutive mark parts with a specific length of PT and space parts with a specific length of QT where T is a reference period, P is a positive integer from n1 to n2, and Q is a positive integer from n1 to n2; storing the pattern signal; generating a plurality of drive pulses from the pattern signal; forming spaces and marks on the data recording medium by generating and emitting thereto an optical beam modulated according to the plurality of drive pulses; reproducing the marks and spaces recorded to the data recording medium; comparing and obtaining a difference between a combination of mark and space parts in the reproduced reproduction signal, and a combination of mark and space parts in the stored pattern signal; and obtaining from this difference a last pulse position Td for application to an original signal containing a sequence of space parts of length QT and mark parts of length PT.

It is therefore possible to accurately obtain mark start position Tu and mark end position Td using simple specific patterns with a short pattern length.

Yet further preferably according to a nineteenth aspect of the present invention, this method obtains last pulse position Td for a plurality of combinations of mark lengths and space lengths by changing P and Q.

Yet further preferably according to a twentieth aspect of the present invention, this method uses a pattern signal containing an adjustment signal for obtaining a DSV of 0.

A twenty-first aspect of the present invention relates to an apparatus for obtaining a first pulse position Tu for a data recording medium having a plurality of tracks, marks formed by emitting to a track in the data recording medium an optical beam modulated by one or a plurality of drive pulses where a number of the drive pulses is determined according to a length of a mark part in the original signal to be recorded to the track, and a control information recording area for recording information using the marks and spaces between the marks, and having recorded thereto at least a first pulse position Tu value and a last pulse position Td value whereby at least a first pulse position Tu and a last pulse position Td of the drive pulse is changed so as to make a reproduction jitter a specific value or less. This apparatus comprises: means (125) for generating a pattern signal containing a pattern of consecutive mark parts with a specific length of PT and space parts with a specific length of QT where T is a reference period, P is a positive integer from n1 to n2, and Q is a positive integer from n1 to n2; means (120) for storing the pattern signal; means (111) for generating a plurality of drive pulses from the pattern signal; means (109, 103–106) for forming spaces and marks on the data recording medium by generating and emitting thereto an optical beam modulated according to the plurality of drive pulses; means (105–108, 112–115) for reproducing the marks and spaces recorded to the data recording medium; means (120) for comparing and obtaining a difference between a combination of mark and space parts in the reproduced reproduction signal, and a combination of mark and space parts in the stored pattern signal; and means (127) for obtaining from this difference a first pulse position Tu for an original signal containing a sequence of space parts of length QT and mark parts of length PT, and storing first pulse position Tu.

Further preferably according to a twenty-second aspect of the present invention, first pulse position Tu is obtained for a plurality of combinations of mark lengths and space lengths by changing P and Q.

Further preferably according to a twenty-third aspect of the present invention, the combinations are classified, and the reproducing means comprises an equalizer (114), and the ratio between the output amplitude of the equalizer at the frequency of the longest mark and the output amplitude of the equalizer at the frequency of the shortest mark is 3 dB or less, provided that the longest mark and the shortest mark are from the same classification.

Distortion error by the equalizer during reproduction can therefore be reduced, and recording with less jitter can be achieved.

Yet further preferably according to a twenty-fourth aspect of the present invention, the pattern signal contains an adjustment signal for obtaining a DSV of 0.

A twenty-fifth aspect of the present invention relates to an apparatus for obtaining a last pulse position Td for a data recording medium having a plurality of tracks, marks formed by emitting to a track in the data recording medium an optical beam modulated by one or a plurality of drive pulses where a number of the drive pulses is determined according to a length of a mark part in the original signal to be recorded to the track, and a control information recording area for recording information using the marks and spaces between the marks, and having recorded thereto at least a first pulse position Tu value and a last pulse position Td value whereby at least a first pulse position Tu and a last pulse position Td of the drive pulse is changed so as to make a reproduction jitter a specific value or less. This apparatus comprises: means (125) for generating a pattern signal containing a pattern of consecutive mark parts with a specific length of PT and space parts with a specific length of QT where T is a reference period, P is a positive integer from n1 to n2, and Q is a positive integer from n1 to n2; means (120) for storing the pattern signal; means (110) for generating a plurality of drive pulses from the pattern signal; means (109, 103–106) for forming spaces and marks on the data recording medium by generating and emitting thereto an optical beam modulated according to the plurality of drive pulses; means (105–108, 112–115) for reproducing the marks and spaces recorded to the data recording medium; means (120) for comparing and obtaining a difference between a combination of mark and space parts in the reproduced reproduction signal, and a combination of mark and space parts in the stored pattern signal; and means (127) for obtaining from this difference a last pulse position Td for an original signal containing a sequence of space parts of length QT and mark parts of length PT, and storing last pulse position Td.

Further preferably according to a twenty-sixth aspect of the present invention, first pulse position Tu is obtained for a plurality of combinations of mark lengths and space lengths by changing P and Q.

Further preferably according to a twenty-seventh aspect of the present invention, the combinations are classified, and the reproducing means comprises an equalizer (114), and the ratio between the output amplitude of the equalizer at the frequency of the longest mark and the output amplitude of the equalizer at the frequency of the shortest mark is 3 dB or less, provided that the longest mark and the shortest mark are from the same classification.

Further preferably according to a twenty-eighth aspect of the present invention, the pattern signal contains an adjustment signal for obtaining a DSV of 0.

A twenty-ninth aspect of the present invention relates to a recording and reproducing apparatus for recording and reproducing a data recording medium having a plurality of tracks, marks formed by emitting to a track in the data recording medium an optical beam modulated by one or a plurality of drive pulses where a number of the drive pulses is determined according to a length of a mark part in the original signal to be recorded to the track, and a control information recording area for recording information using the marks and spaces between the marks, and having recorded thereto at least a first pulse position Tu value and a last pulse position Td value whereby at least a first pulse position Tu and a last pulse position Td of the drive pulse is changed so as to make a reproduction jitter a specific value or less. This recording and reproducing apparatus comprises: means (1505–1508, 1512–1517) for reproducing a first pulse position Tu and a last pulse position Td prerecorded to the data recording medium; means (1520) for storing the reproduced first pulse position Tu and last pulse position Td; means (1510) for generating a drive pulse based on a data recording signal, and correcting the generated drive pulse based on the first pulse position Tu and last pulse position Td; means (109, 103–106) for emitting an optical beam based on the corrected drive pulses to form spaces and marks on the data recording medium.

Further preferably according to a thirtieth aspect of the present invention, the reproducing means comprises an equalizer (1514), and the ratio between the output amplitude of the equalizer at the frequency of the longest mark and the output amplitude of the equalizer at the frequency of the shortest mark is 3 dB or less.

A thirty-first aspect of the present invention relates to a manufacturing apparatus for manufacturing a data recording medium having a plurality of tracks, marks formed by emitting to a track in the data recording medium an optical beam modulated by one or a plurality of drive pulses where a number of the drive pulses is determined according to a length of a mark part in the original signal to be recorded to the track, and a control information recording area for recording information using the marks and spaces between the marks, and having recorded thereto at least one of a first pulse position Tu value and a last pulse position Td value whereby at least one of a first pulse position Tu and a last pulse position Td of the drive pulse is changed so as to make a reproduction jitter a specific value or less. This apparatus comprises: means (2701) for storing previously obtained first pulse position Tu and last pulse position Td values for a drive pulse sequence; adjustment method information storage (2702) for storing information indicative of a pulse position adjustment method; means (2703) for converting the adjustment method information, first drive pulse position Tu, and last drive pulse position Td to a signal for recording, and generating a recording signal; and laser generating means (2704, 2705, 2706) for generating a laser beam based on the recording signal.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 4A and 4B show exemplary pulse movement tables in the first embodiment shown in FIG. 1;

FIG. 19 shows exemplary pulse movement tables in the second embodiment shown in FIG. 15;

FIG. 24 shows alternative pulse movement tables according to the present invention;

DESCRIPTION OF THE PREFERRED EMBODIMENTS

The preferred embodiments of the present invention are described below with reference to the accompanying figures.

Figure 1:
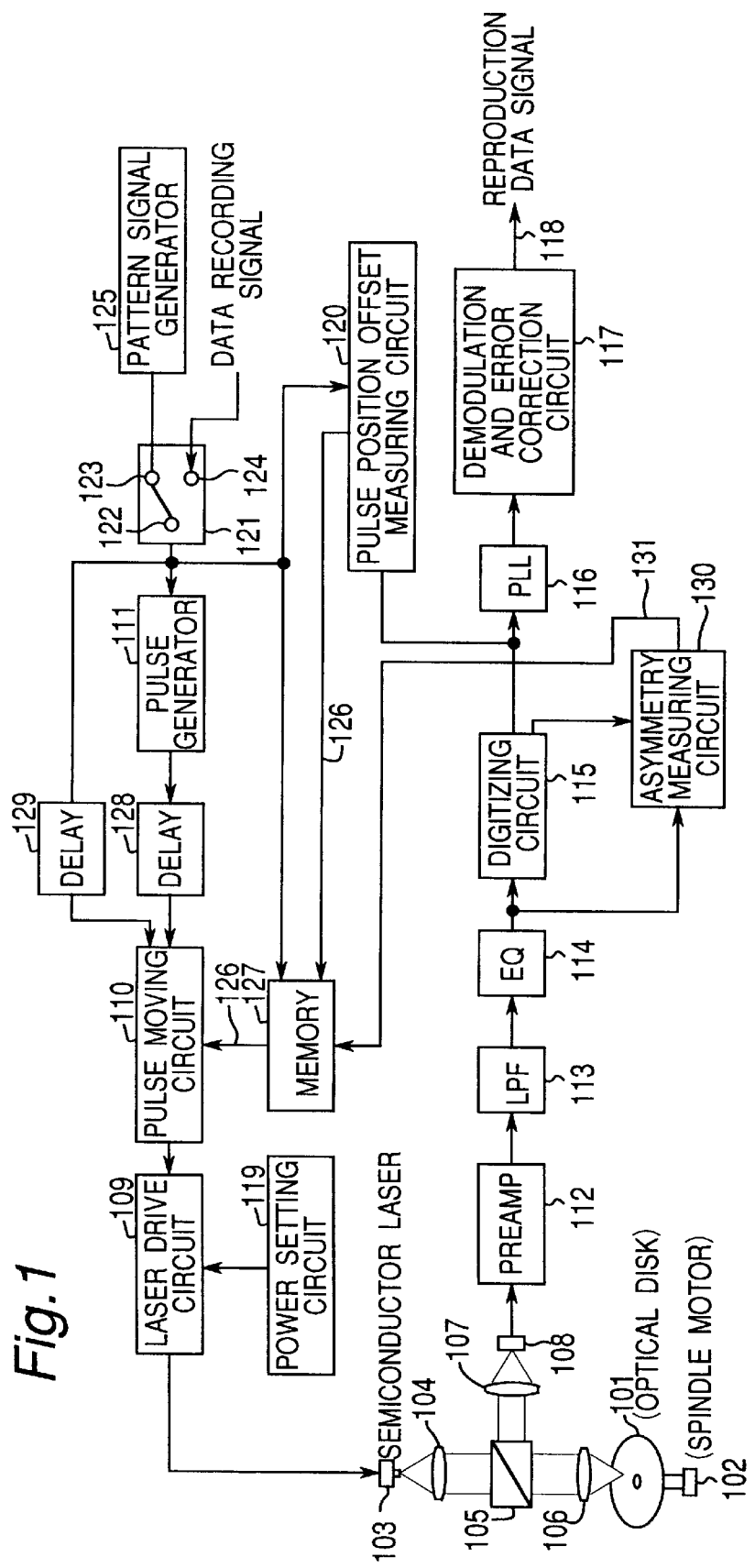
FIG. 1 is a block diagram of an optical data recording device according to a first embodiment of the present invention.

An optical data recording method according to a preferred embodiment of the present invention is described next below with reference to the accompanying figures. FIG. 1 is a block diagram of an optical data recorder according to a first preferred embodiment of the present invention. It is to be noted that this optical data recorder is used primarily by manufacturers and other commercial users for manufacturing optical disks.

Shown in FIG. 1 are: an optical disk 101 having a plurality of concentric or spiral tracks, spindle motor 102, semiconductor laser 103, collimator lens 104, beam splitter 105, objective lens 106, collective lens 107, photodetector 108, laser drive circuit 109, pulse moving circuit 110, delay circuits 128 and 129 each having the same delay time, pulse generator 111, preamp 112, low pass filter 113, reproduction equalizer 114, digitizing circuit 115, PLL 116, demodulation and error correction circuit 117, reproduction data signal 118, power setting circuit 119, pulse position offset measuring circuit 120, switch 121, switch contacts 122, 123, and 124, pattern signal generator 125, bus 126 connecting pulse position offset measuring circuit 120 and pulse moving circuit 110, and memory 127 for storing a table recording pulse movement information.

Memory 127 stores the two tables shown in FIG. 4 (b). These two tables are modified by the method of the present invention, and are then rewritten as the two tables shown in FIG. 4 (a).

Figure 27:
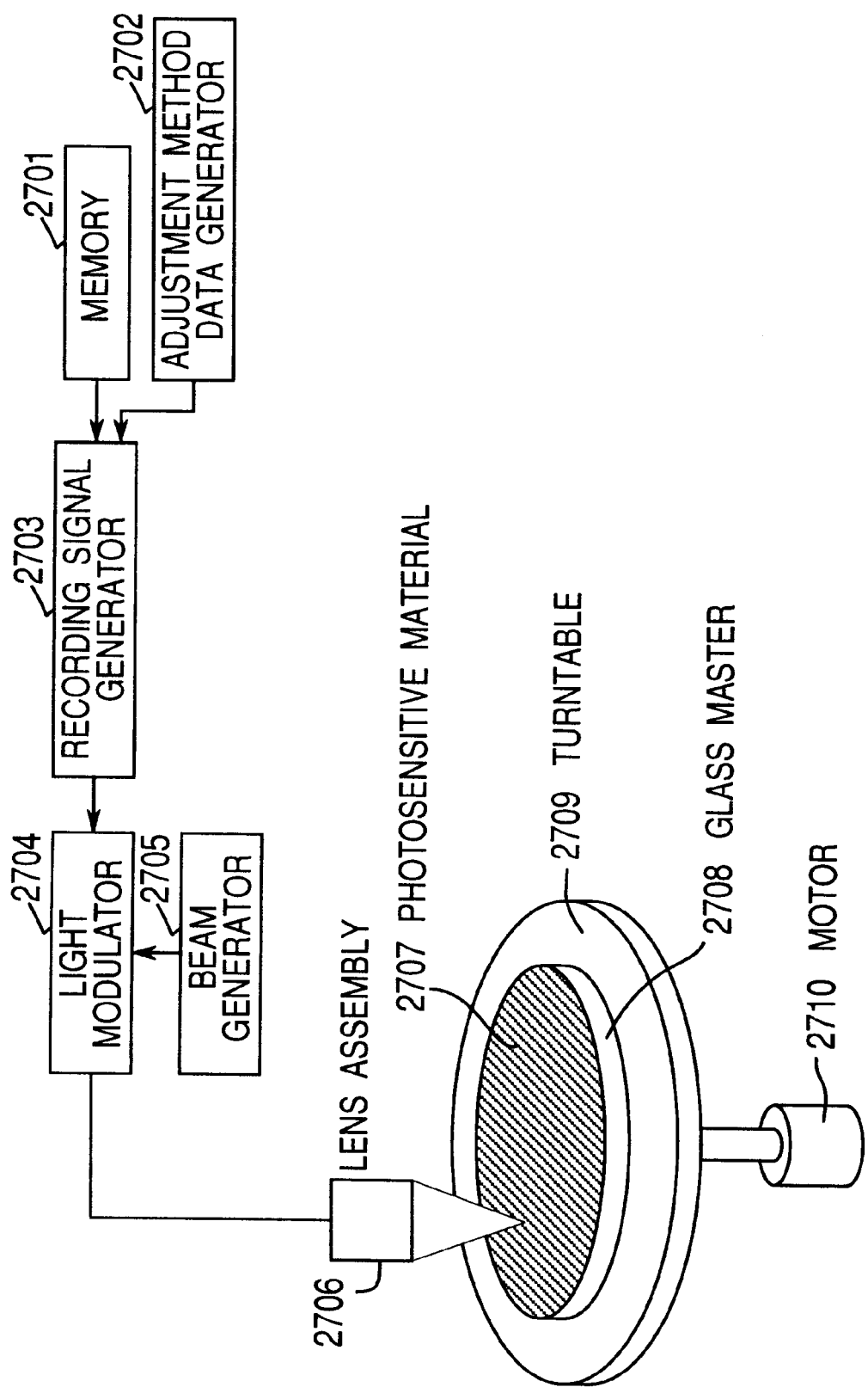
FIG. 27 is a block diagram of a system for cutting an optical disk master according to the present invention.

The optical data recorder shown in FIG. 1 is for generating a table such as shown in FIG. 4 (a). The table shown in FIG. 4 (a) and generated by the recorder shown in FIG. 1 is then transferred to a memory in another recording device such as shown in FIG. 27, and is recorded to a predetermined recording area on all manufactured optical disks.

It is to be noted that the optical head of the optical data recorder shown in FIG. 1 comprises the semiconductor laser 103, collimator lens 104, beam splitter 105, objective lens 106, collective lens 107, and photodetector 108. When an optical disk 101 is loaded to the optical data recorder, the optical head moves to an area used for determining the optimum positions for the start position and end position of each mark.

This area for determining the optimum start and end positions is an area at the inside circumference area or outside circumference area of the disk, and is outside of the user data recording area. An exemplary area is the drive test zone of the disk. Switch 121 switches contact 122 to contact 123 at this time.

It is to be noted that if limited specifically to recording devices used by a manufacturer of optical disks, this area for determining the optimum start and end positions can be the user data area.

The power setting circuit 119 sets the laser drive circuit 109 to either peak power or bias power. At this time the output signal from pattern signal generator 125 is passed by switch 121 to the pulse generator 111. Signal flow from the pulse generator 111 is described further below with reference to FIG. 2.

Figure 2:
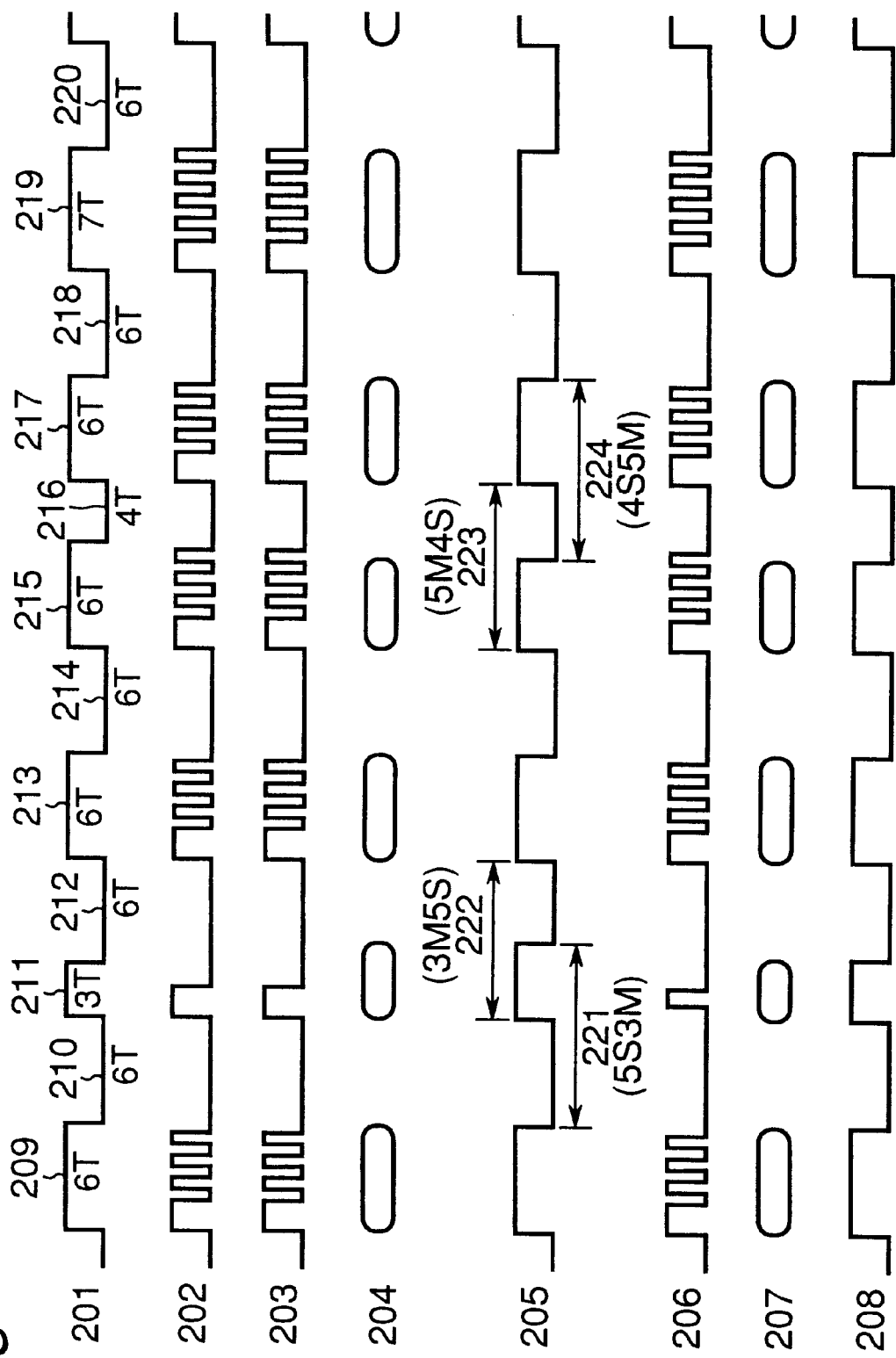
FIG. 2 illustrates signals used in the first embodiment shown in FIG. 1.

Shown in FIG. 2 are a first pattern signal 201, which is the output signal from the pattern signal generator 125; output signal 202 from the pulse generator 111; output signal 203 from the pulse moving circuit 110; and mark pattern 204 formed in the recording track of the optical disk 101 as a result of modulating laser power output between peak power and bias power levels according to output signal 203. It is to be noted that while signals 201, 202, and 203 are not generated on the same time base, for convenience they are shown with corresponding parts in each signal aligned vertically.

In first pattern signal 201, mark parts 209, 211, 213, 215, 217, and 219 are the parts of the signal whereby a mark is to be formed on the disk, and space parts 210, 212, 214, 216, 218, and 220 are the parts of the signal that appear as a space on disk. It is further assumed below that mark part 209 follows space part 220 such that first pattern signal 201 comprises a repeating pattern of parts 209 to 220.

For example, when data generated by (2,10) run-length limited modulation is recorded using a mark edge recording method, the marks and spaces have a shortest length of 3T and a longest length of 11T where T is the reference period. Mark part 209 is a 6T signal (a 6T mark part below), space part 210 is a 6T space, 211 is a 3T mark, 212 is a 6T space, 213 is a 6T mark, 214 is a 6T space, 215 is a 6T mark, 216 is a 4T space, 217 is a 6T mark, 218 is a 6T space, 219 is a 7T mark, and 220 is a 6T space.

Note that if DSV is the difference of the sum of mark and space lengths in a specific period, a reproduction signal with a small dc component or low frequency component can be obtained when the marks and spaces are reproduced by inserting signals 219 and 220 whereby a DSV of substantially zero can be obtained. Reproducing a signal with many dc components or low frequency components can result in the digitizing circuit 115 erroneously generating a signal with the wrong sequence of 0s and 1s.

To prevent this, a 7T mark part 219 and 6T space part 220 are inserted to the first pattern signal 201 as a compensation signal assuring that the DSV is substantially 0. More specifically, first pattern signal 201 is generated so that the sum (34T) of the periods of mark parts 209, 211, 213, 215, 217, and 219 is equal to the sum (34T) of the space parts 210, 212, 214, 216, 218, and 220. DSV is calculated by adding the periods of the mark parts as positive values and the periods of the space parts as negative values. As a result, the DSV of first pattern signal 201 is 0.

This first pattern signal 201 is converted to a pulse sequence by the pulse generator 111, resulting in pulse generator output signal 202. Pulse output from the pulse generator 111 corresponding to marks of lengths from 3T to 11T is shown in FIG. 3.

Figure 3:
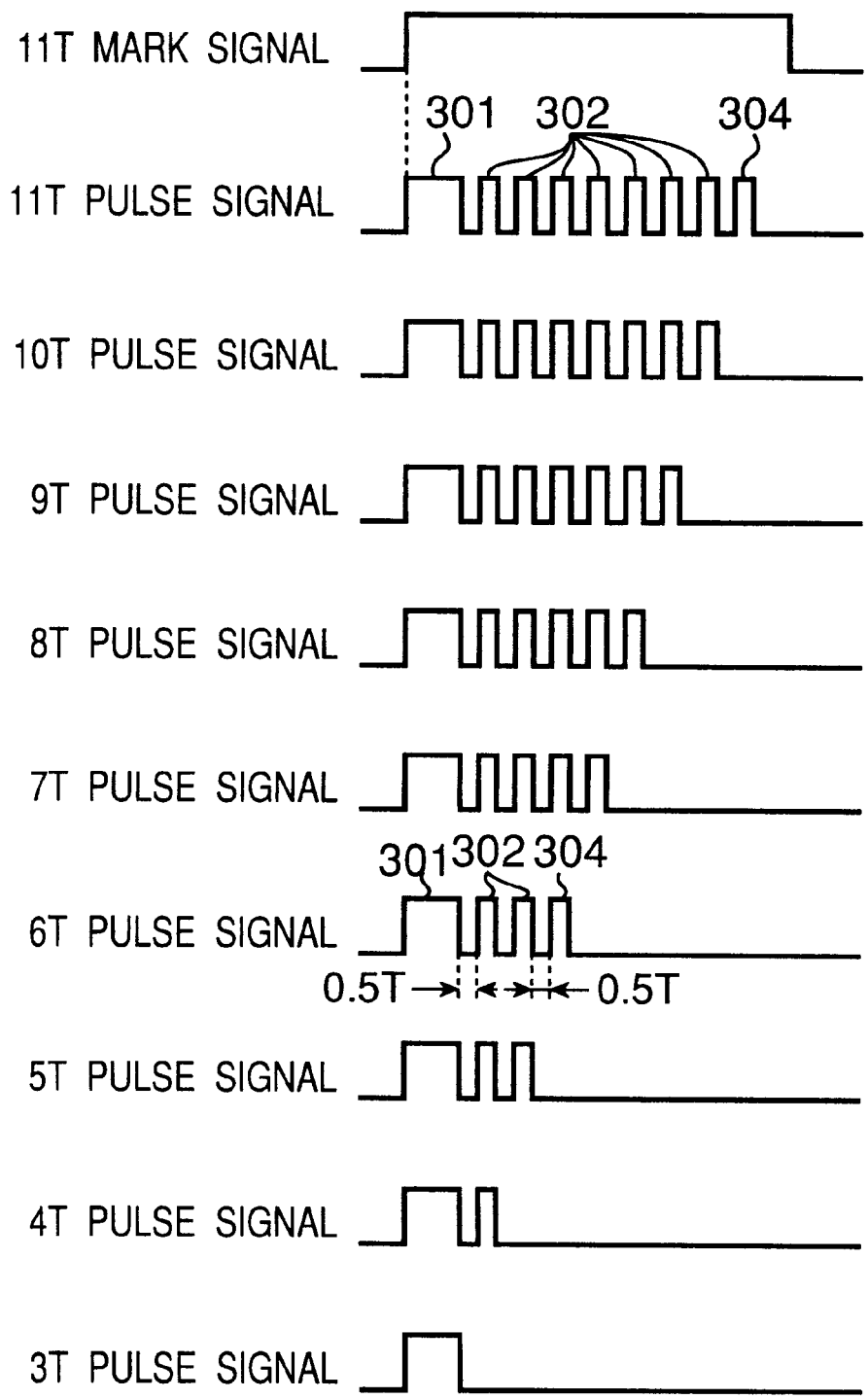
FIG. 3 illustrates recording pulse sequences in the first embodiment shown in FIG. 1.

Referring by way of example to a 6T signal in FIG. 3, the pulse at the start of the signal is referred to as the first pulse 301, and the pulse at the end of the signal is the last pulse 304. The pulses between the first pulse 301 and last pulse 304 are referred to as multiple pulses 302 and have a constant period.

In a 6T mark there are two multiple pulses 302, in a 7T mark there are three, and in a 5T mark there is one. It will thus be obvious that the number of multiple pulses 302 between the first and last pulses increases by one with each 1T increase in signal length, and decreases one with each 1T decrease in signal length. A 4T mark, therefore comprises only the first and last pulses, and has no multiple pulses 302 therebetween. In addition, a 3T mark comprises just one pulse.

It is to be noted that in this preferred embodiment the time-base length of the first pulse is 1.5T, the last pulse is 0.5T, and the length of the multiple pulses is also 0.5T. The invention shall not be so limited, however, and the length, count, or period of these pulses can be varied as necessary according to the structure of the optical disk 101.

As noted above, first pattern signal 201 and pulse generator output signal 202 are not on the same time base. However, the difference between the leading edge of first pattern signal 201 and the leading edge of the first pulse of the pulse generator output signal 202 is the same for any particular mark parts, and the difference between the trailing edge of the first pattern signal 201 and the trailing edge of the last pulse of pulse generator output signal 202 is also the same for any particular mark parts.

The pulse generator output signal 202 is input to the pulse moving circuit 110, which generates and outputs a signal 203 in which the positions of the first pulse and last pulse are moved. FIG. 4 shows the combinations of marks and spaces used for shifting the first pulse and last pulse positions.

FIG. 4 (a) shows the pulse movement tables after correction by the method of this present invention, and FIG. 4 (b) shows the tables before correction. Symbols 3S3M, 4S3M, and so forth in the tables in FIG. 4 (a) are a type of address, and are indicative of the signal type as well as the value written to that address. When read as an address, the value 3S3M, for example, represents a signal in which a 3T mark follows a 3T space. As will be described more fully below, the value of the first pulse movement TF stored at the place indicated by 3S3M is the movement required when a 3T mark follows a 3T space.

These first pulse movement TF values are obtained by, for example, a trial and error process using a particular optical test disk, and the resulting values are compiled in the tables in FIG. 4 (a). The content of the completed table is stored for all optical disks having the same structure as the optical test disk. Predetermined initial values are stored in the table on the left in FIG. 4 (b) for the first pulse. The table on the right in FIG. 4 (b) stores the initial values before correcting the last pulse movement.

The position of the first pulse changes according to the length of the mark and the immediately preceding space. In this preferred embodiment, the marks and spaces are separated into three groups, that is, 3T, 4T, and 5T or longer. A total of nine different last pulse positions are therefore defined.

Figure 20:
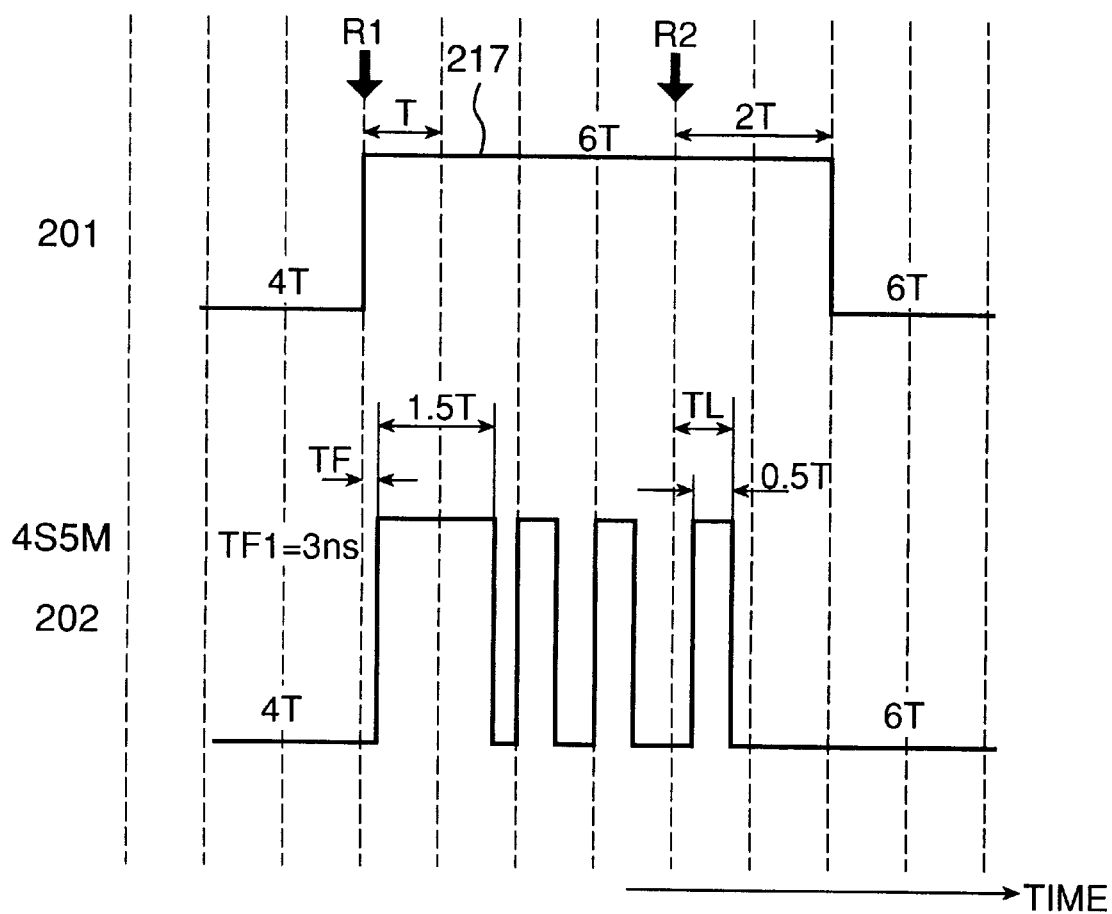
FIG. 20 is a waveform diagram for describing first pulse movement according to the present invention.

FIG. 20 is an enlarged view of the 6T mark 217 in the first pattern signal 201 shown in FIG. 2, and the corresponding part in the pulse generator output signal 202. As shown in the figure, a 4T space 212 is immediately before the 6T mark 217. A 4T space followed by a 6T mark belongs to the 4S5M group in the left table in FIG. 4 (a). Correcting the initial first pulse movement TF stored for this group is described below.

The pattern signal generator 125 in the optical data recorder shown in FIG. 1 generates a first pattern signal 201. This first pattern signal 201 is sent to the pulse generator 111, delay circuit 129, pulse position offset measuring circuit 120, and memory 127. As noted above, the two tables shown in FIG. 4 (b) are prestored to memory 127. The pulse position offset measuring circuit 120 also stores the first pattern signal 201, which is used for comparison with the reproduction signal during data reproduction. The pulse generator 111 generates the output signal 202 required for recording the pattern signal. Referring to the signals shown on the top two rows in FIG. 3, for example, the pulse generator 111 generates a first pulse 301 corresponding to the rising edge of the mark in the first pattern signal 201, then outputs multiple pulses 302, and last pulse 304.

The pulse generator output signal 202 is delayed a predetermined period by the delay circuit 128, and then passed to the pulse moving circuit 110. This predetermined delay period is 13T in this exemplary embodiment. The first pattern signal 201 is analyzed in memory 127 to determine to which of the 18 signal groups, that is, 3S3M, 3S4M, 3S5M, 4S3M, 4S4M, 4S5M, 5S3M, 5S4M, 5S5M, 3M3S, 4M3S, 5M3S, 3M4S, 4M4S, 5M4S, 3M5S, 4M5S, and 5M5S, the signal in the preceding 10T or longer period belongs. For example, if a 4T space 216 is followed by a 6T mark 217 in the first pattern signal 201 from the pattern signal generator 125, memory 127 detects that the signal belongs to the 4S5M group. In response to this determination, memory 127 then reads and outputs to the pulse moving circuit 110 the amount of movement stored in the table at 4S5M0. The initial 4S5M0 movement value is read from the table the first time a movement value is read. The pulse moving circuit 110 then moves the first pulse of the pulse generator output signal 202 supplied thereto after a predetermined delay based on the initial movement value read from 4S5M0.

Movement of the first pulse is described in further detail below with reference to FIG. 1 and FIG. 20. When the pulse moving circuit 110 is notified by memory 127 that a pattern belonging to a specific group will soon arrive from the delay circuit 129, it also receives the first pulse movement TF for that pattern from the memory 127. For example, when the memory 127 informs the pulse moving circuit 110 that a pattern belonging to the 4S5M group, that is, a 4T space 216 following by a 6T mark 217, will arrive from the delay circuit 129, it also sends the first pulse movement TF read for the 4S5M0 group. The pulse moving circuit 110 then begins counting first pulse movement TF at the rising pulse edge of the 6T mark 217 received from the delay circuit 129, that is, at time R1 in FIG. 20. Output of the first pulse from the delay circuit 128 is delayed for the period counted by the pulse moving circuit 110, that is, for pulse movement TF1.

When pulse movement is referenced to the rising edge R1 of the first pattern signal 201, for example, first pulse movement TF1 is expressed as the time difference from reference time R1 as shown in FIG. 20. In this exemplary embodiment, pulse movement TF is approximately 3 ns. It is to be noted that the first pulse is moved without changing the pulse width.

The pattern signal shown in FIG. 2 contains signal components belonging to four of the 18 groups in the table shown in FIG. 4 (a): type 3M5S in period 221, type 5S3M in period 222, type 4S5M in period 223, and type 5M4S in period 224. Each of the pulse signal components corresponding to these four types in first pattern signal 201 are therefore moved.

The laser is therefore driven according to these moved pulses to record the actual marks. The resulting marks 204 are shown in FIG. 2. In a preferred embodiment of the present invention, the first pattern signal 201 comprising elements 209 to 220 as shown in FIG. 2 is output repeatedly and recorded around one track. When the recording to one complete track is thus completed, the track is reproduced. As will be described more fully below, reproduction includes converting an optical signal from the photodetector 108 to an electrical signal, and then processing this electrical signal with preamp 112, low pass filter 113, reproduction equalizer 114, and digitizing circuit 115 to obtain reproduction signal 205. The reproduction signal 205 is input to the pulse position offset measuring circuit 120. The reproduction signal 205 from a single track is thus input repeatedly to the pulse position offset measuring circuit 120. The pulse position offset measuring circuit 120 thus reads each of the periods 221, 222, 223, and 224 associated with different signal types multiple times, and calculates the average for each period.

The pulse position offset measuring circuit 120 compares the periods 221, 222, 223, 224 corresponding to the types obtained in the recorded first pattern signal 201 during recording, and the averages for the same periods obtained from the reproduction signal 205 to detect whether any shifting in pulse position has occurred. Using, by way of example, the signals recorded and reproduced as described above, the combined time of the 4T space 216 and 6T mark 217 in the first pattern signal 201 is compared with the average obtained for the corresponding period 224 in the reproduction signal 205, and the difference therebetween is obtained. If there is a difference, the pulse position offset measuring circuit 120 determines that the pulse position shifted, and the calculated difference is therefore sent to memory 127. Because this difference is the result of the initial movement value 4S5M0, this initial movement value 4S5M0 is increased or decreased in memory 127 according to the difference, thereby correcting the stored movement value. This corrected value is then overwritten to type 4S5M.

It is to be noted that the stored movement value is corrected and overwritten to 4S5M using a single feedback loop (through 110, 109, 108, 112, 115, 120, 126) in the above exemplary embodiment. It will be obvious, however, that a plurality of feedback loops can be alternatively used to correct the value of the first pulse movement TF as shown in FIG. 20.

Movement of the last pulse position is similarly corrected. That is, the last pulse position movement changes according to the mark length and the length of the following space. In this exemplary embodiment marks and spaces are separated into three groups based on length, 3T, 4T, and 5T or longer, and pulse position movement is defined for each of the nine possible mark/space combinations. The last pulse movement TL is then calculated using the same method used to calculate the first pulse movement TF.

Figure 21:
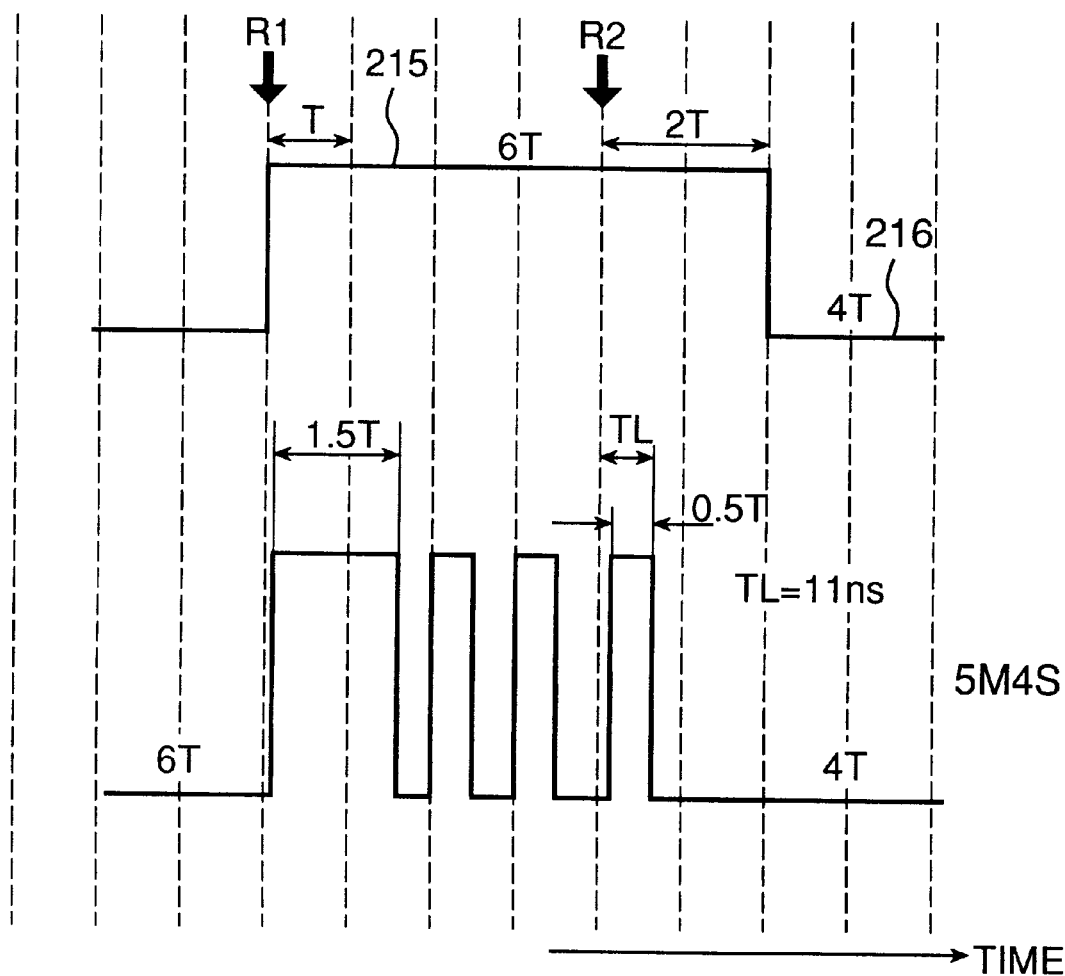
FIG. 21 is a waveform diagram for describing last pulse movement according to the present invention.

FIG. 21 is an enlarged view of the part of the pulse generator output signal 202 corresponding to the 6T mark 215 in the first pattern signal 201 shown in FIG. 2. The last pulse movement TL is corrected in the same manner as the first pulse movement TF described above. In the case of the last pulse movement TL, however, the period from time reference R2 offset 2T forward of the trailing edge of the mark to the trailing edge of the last pulse is called the time interval, and this time interval is corrected by means of the loop described above with reference to the first pulse. The last pulse movement TL is approximately 13 ns in this exemplary embodiment. It is to be also noted that the width of the last pulse does not change even though the amount of last pulse movement TL changes, and in this exemplary embodiment the pulse width remains the same with the pulse simply shifted on the time axis.

The output signal 206 from the pulse moving circuit 110 obtained using the corrected pulse movement tables shown in FIG. 4 (a), the marks 207 recorded as a result of this output signal 206, and the reproduction signal 208 reproduced from these marks 207, are also shown in FIG. 2. While the reproduction signal 205 obtained using the original, uncorrected pulse movement table (FIG. 4 (b)) is not identical to the original pattern signal 201, there is substantially no difference between the reproduction signal 208 obtained using the corrected pulse movement table (FIG. 4 (a)) and the original pattern signal 201.

Figure 11:
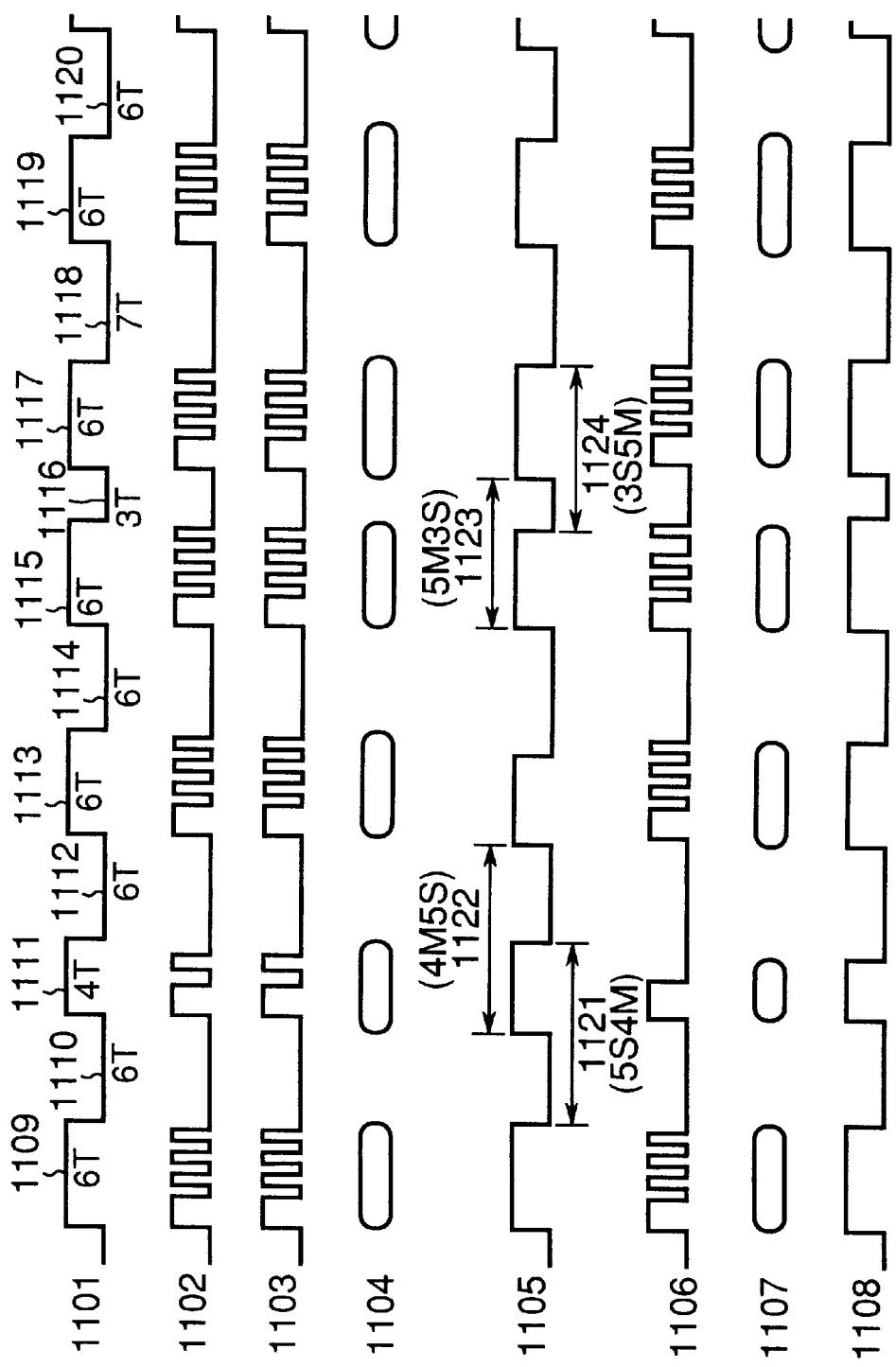
FIG. 11 illustrates signals used in the first embodiment shown in FIG. 1.
Figure 12:
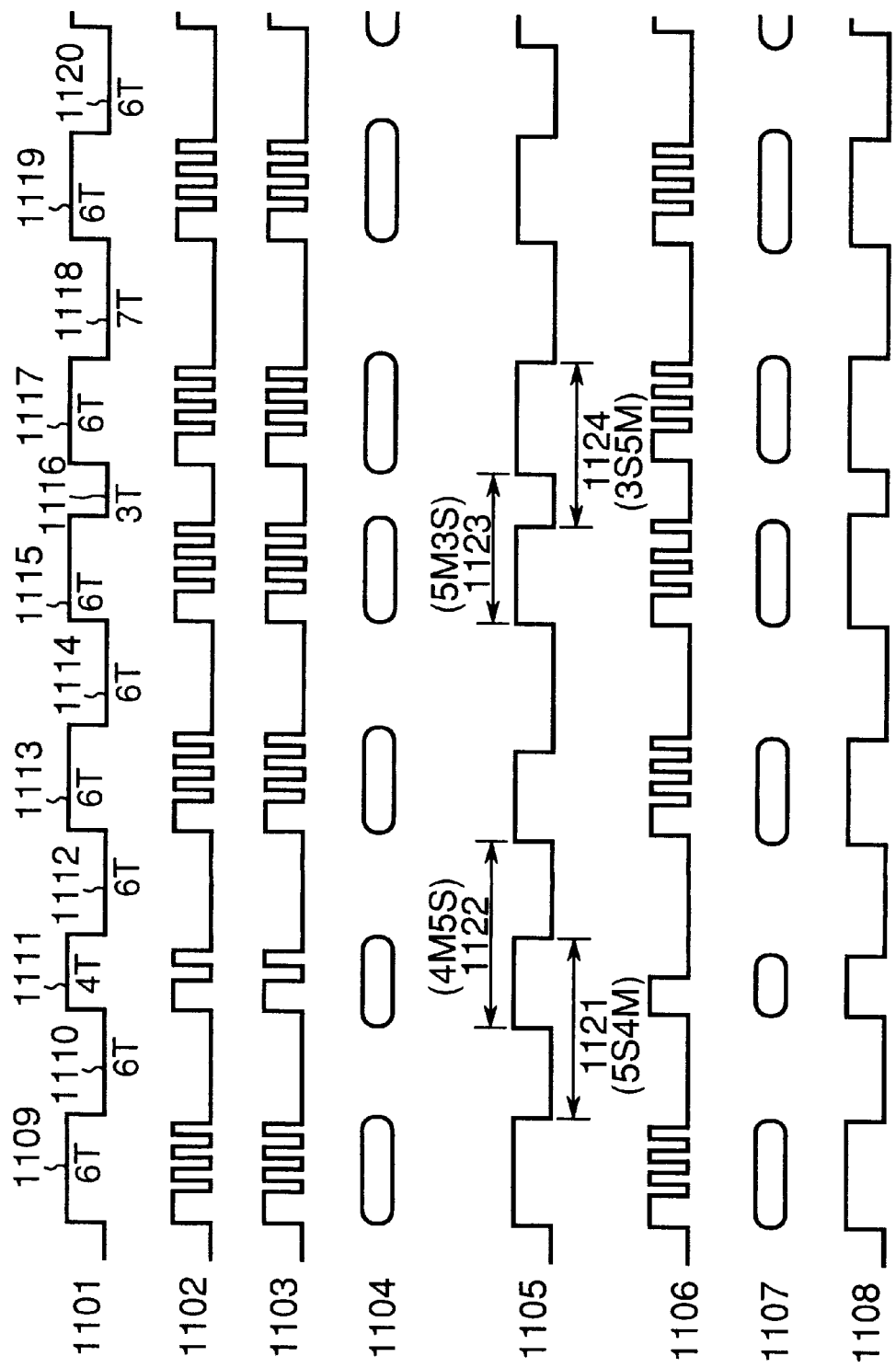
FIG. 12 illustrates signals used in the first embodiment shown in FIG. 1.
Figure 13:
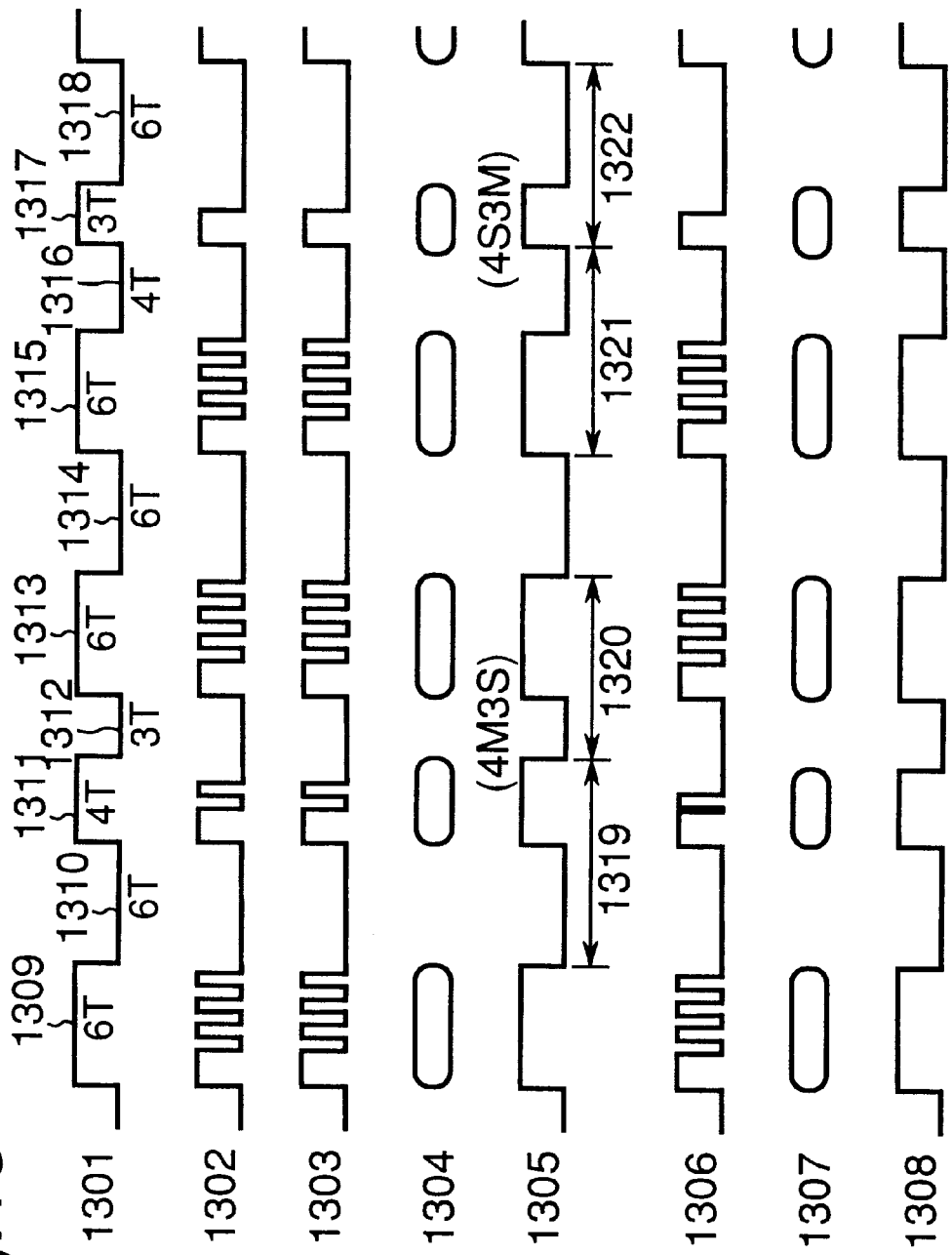
FIG. 13 illustrates signals used in the first embodiment shown in FIG. 1.
Figure 14:
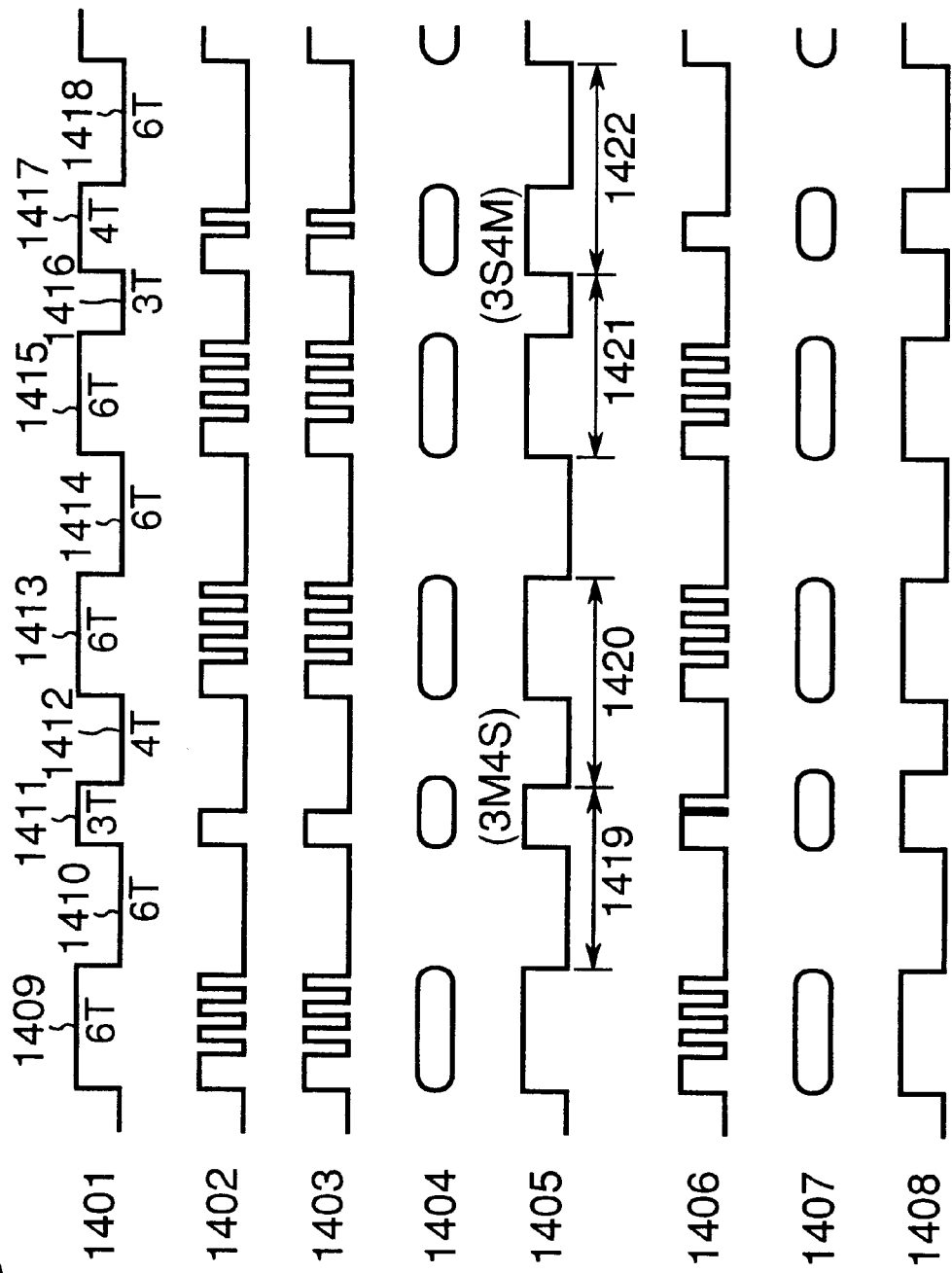
FIG. 14 illustrates signals used in the first embodiment shown in FIG. 1.

It is to be noted that four of the eighteen pulse movement values are corrected as described above using the first pattern signal 201 shown in FIG. 2. The other values are similarly corrected using other pattern signals. More specifically, types 4M5S, 5S4M, 3S5M, and 5M3S are corrected using a pattern signal 1101 as shown in FIG. 11; types 4M4S, 3M3S, 4S4M, 3S3M are corrected using a pattern signal 1201 as shown in FIG. 12; types 4M3S, 4S3M are corrected using a pattern signal 1301 as shown in FIG. 13; types 3M4S, 3S4M are corrected using a pattern signal 1401 as shown in FIG. 14.

Figure 28:
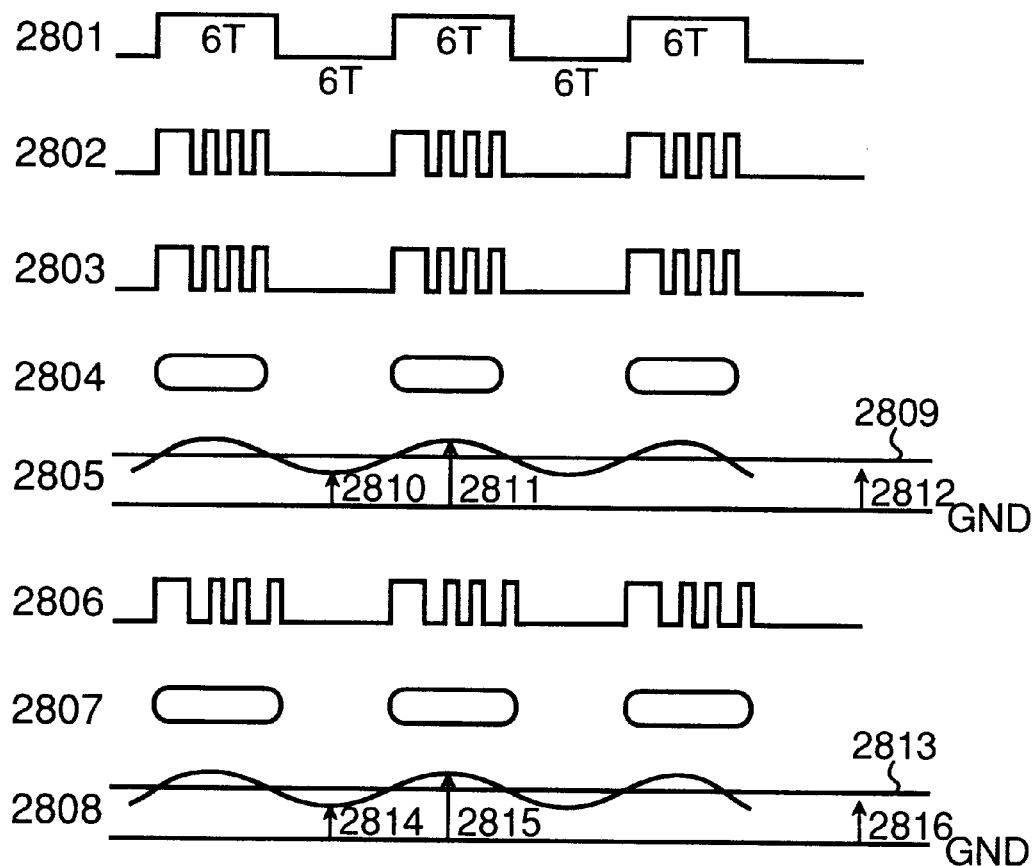
FIG. 28 illustrates signals used in the first embodiment shown in FIG. 1.

It is to be noted that types 5M5S and 5S5M can be corrected using a pattern signal 2801 as shown in FIG. 28, or a default value therefor can be simply defined. It is to be noted that types 5M5S and 5S5M are preferably corrected before the other types. This is because these marks and spaces have the longest period and are therefore least affected by thermal interference. The delay period is therefore small, and can be used as a reference value for determining the other delay periods.

The signal types used for changing the movement of the first pulse and last pulse are determined based on the three major factors described below.

The first factor is the effect of heat accumulation in the recording film when marks are recorded, the amount of thermal interference, and the difference in the amount of thermal interference resulting from the specific mark/space combination. Note that, as described above, thermal interference refers to the process whereby heat at the end of a recorded mark transfers through the following space and affects the heating process at the beginning of the next mark, and heat at the beginning of a next recorded mark conversely travels back through the preceding space and affects the cooling process at the end of the preceding mark.

The affects of heat accumulation in the recording film can be reduced by inserting a plurality of multiple pulses between the first and last pulses, and emitting a laser beam of the lowest power level required for mark formation. These heat accumulation effects cannot be completely eliminated, however, because the multiple pulses are formed with a constant period in order to simplify the pulse generator 111.

The extent of the effect of heat accumulation and thermal interference is also dependent upon numerous factors, including the structure of the optical disk 101, properties of the recording film, recording pulse, the linear speed used for recording to optical disk 101, and the length of the shortest mark. The effect of heat accumulation and thermal interference can also be attenuated to a certain degree by optimizing each of these influencing factors. To more fully understand this, let us focus on how the effects of heat accumulation and thermal interference vary with different combinations of marks and spaces.

Figure 5:
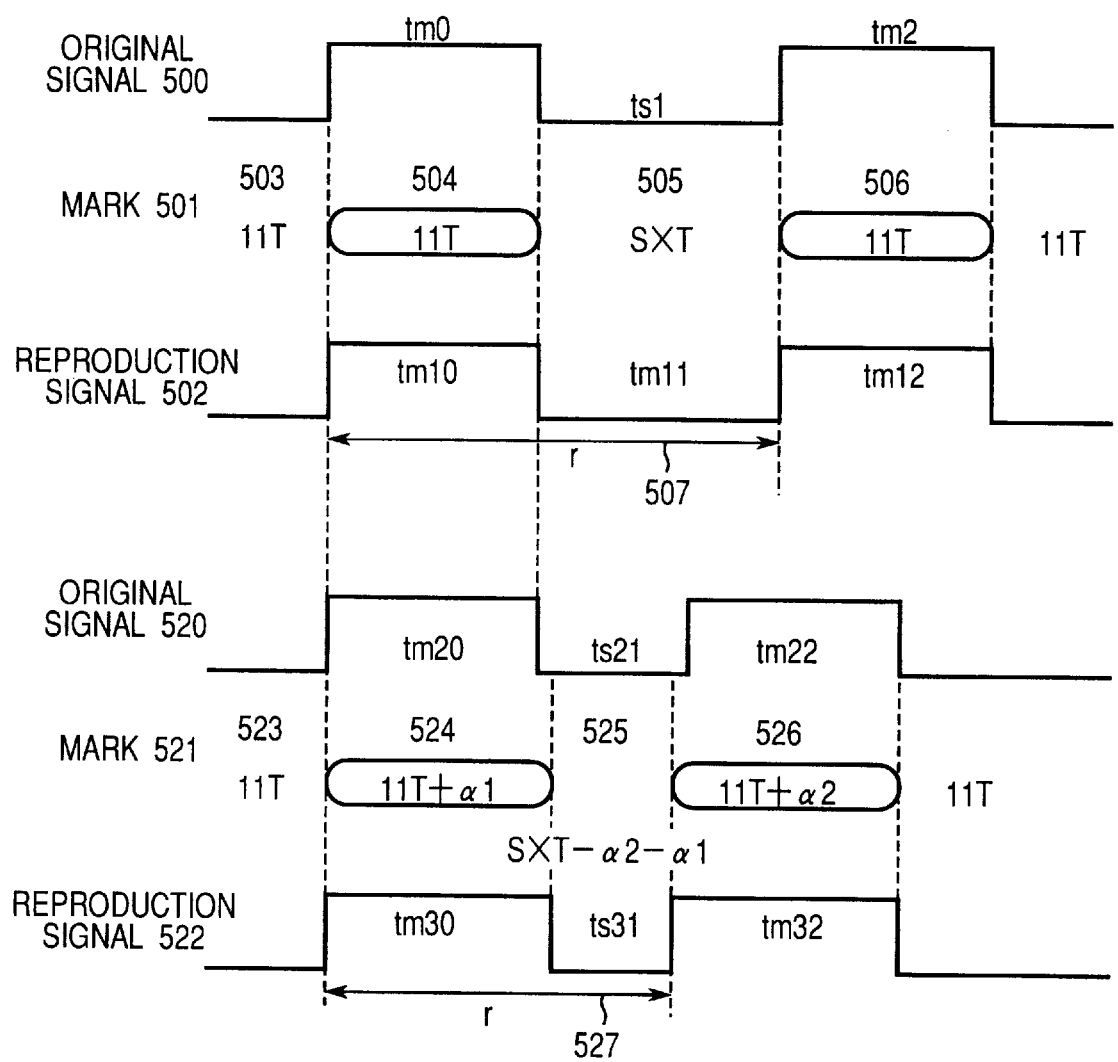
FIG. 5 is used to describe a grouping method in the first embodiment shown in FIG. 1.

As will be known from FIG. 4 (a), each first pulse is classified as one of nine types or groups, which are used for determining the movement of the first and last pulses. A method for determining which of these nine types to use based on the above-noted first factor is described next with reference to FIG. 5 to FIG. 9. FIG. 5 shows a method for determining the dependency of the elongation of the starting position of an 11T mark on the space preceding the 11T mark.

Shown in FIG. 5 are the original signal 500, that is, the two-value waveform of the signal used for recording, marks 501 recorded to the data recording medium, and reproduction signal 502, that is, the two-value waveform of the signal reproduced from the marks 501 recorded to the disk. Original signal 500, marks 501, and reproduction signal 502 are the result of recording marks with a space (S×T) sufficiently long for an 11T mark recorded between the marks. Intersymbol interference is thus minimized as a result of this sufficiently long space.

It is to be noted that space ts1 in the original signal 500 is ideally equal to the time interval of space tm11 in the reproduction signal 502. The positions of the first and last pulses are moved to more closely approach this ideal. If the position of the mark start position only is considered when determining how much to move the marks, the first and last pulses can be categorized into approximately three groups. A method for determining the mark start position group is described more fully below with reference to original signal 520, marks 521, and reproduction signal 522 described below.

The original signal 520 is the two-value waveform used for recording. In this case, however, the space ts21 between the two 11T marks is shorter than that shown in the above described original signal 500. As a result, heat at the trailing end of 11T mark 524 transfers through space 525 to the next 11T mark 526, thus accelerating the start of 11T mark 526. The nominal length of 11T mark 526 is thus increased by length a2.

As a result, the time interval of space ts31 in reproduction signal 522 corresponding to space ts21 in the original signal 520 is shortened, and the correct reproduction signal cannot be obtained. A correct reproduction signal can be obtained, however, by predicting the elongation at the start of 11T mark 526, and delaying the rising edge of the mark part tm22 in the original signal 520. The specific delay depends on the length of the space ts21. The length of the space ts21 is therefore varied for each time T from 3T to 11T, an 11T mark is recorded for each space ts21, and edge distance 527 is measured for each case.

Figure 6:
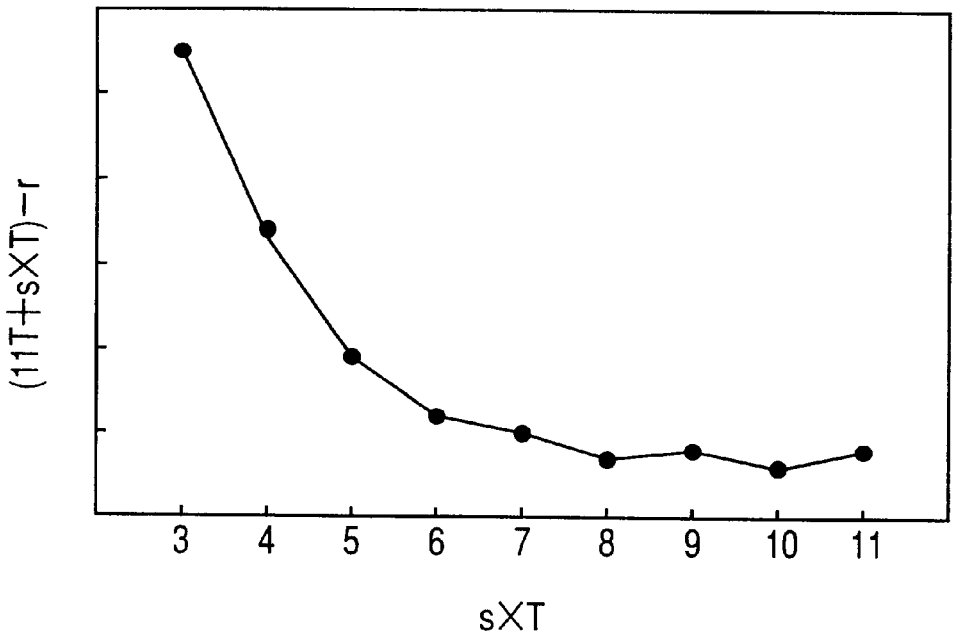
FIG. 6 is used to describe a grouping method in the first embodiment shown in FIG. 1.

The results of these measurements are graphed in FIG. 6. The horizontal axis shows the length 3T to 11T of each space ts21 in original signal 520, and the vertical axis shows the difference of the combined length of mark part tm20 and space part ts21 in the original signal 520 minus the edge distance r 527. As the space length decreases, the point at which 11T mark 526 starts moves forward, that is, closer to the preceding pulse, due to thermal interference when the space is short, such as 3T or 4T.

Figure 7:
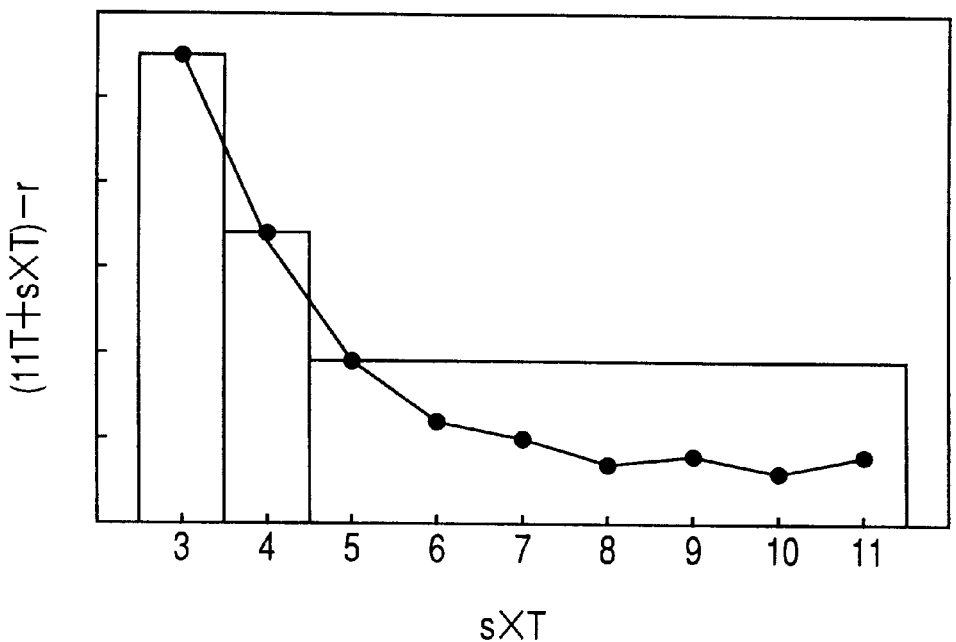
FIG. 7 is used to describe a grouping method in the first embodiment shown in FIG. 1.

FIG. 7 shows one way of combining spaces of substantially the same length into common groups based on the values shown on the vertical axis in FIG. 6. Spaces of substantially different length are placed in separate groups. This method produces three groups: 3T spaces, 4T spaces, and spaces of 5T or longer.

Figure 8:
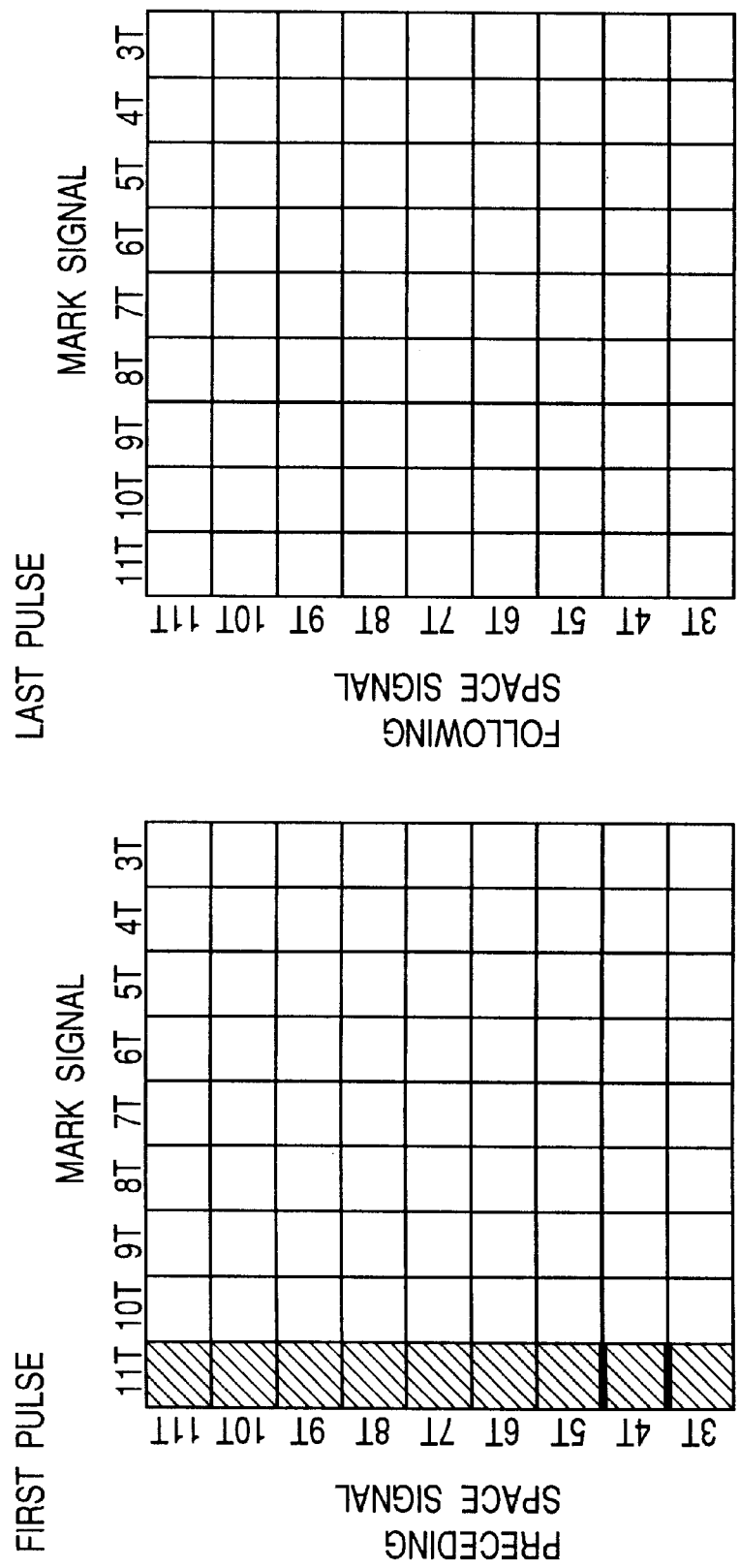
FIG. 8 is used to describe a grouping method in the first embodiment shown in FIG. 1.

These results and groups are further mapped in FIG. 8. Shaded cells indicate space/mark combinations for which measurements have been obtained. Bold lines indicate the groups.

As described with reference to FIG. 5, elongation at the start of an 11T mark varies according to the length of the immediately preceding space, and can be separated into the above three groups, 3T, 4T, and 5T or longer.

Figure 9:
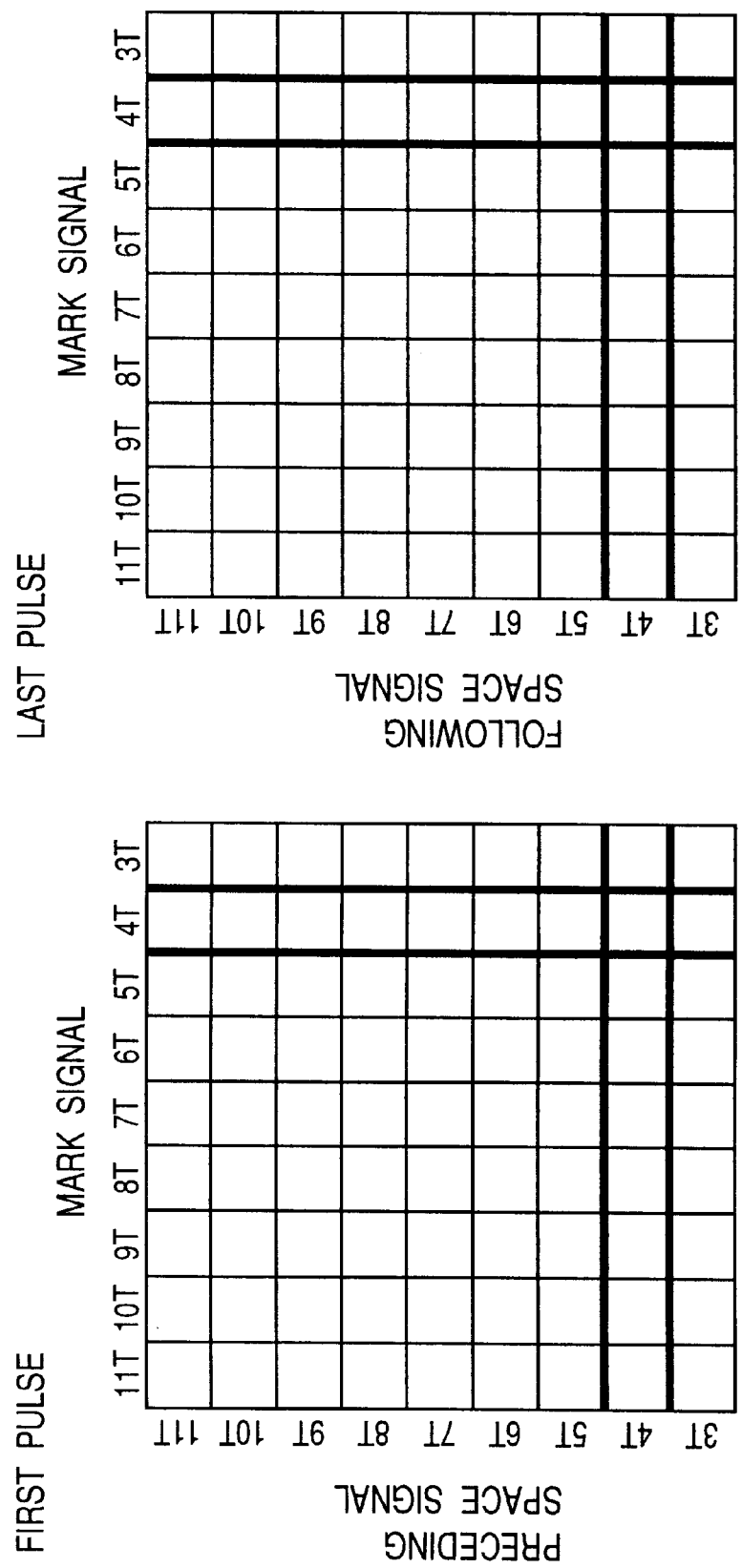
FIG. 9 is used to describe a grouping method in the first embodiment shown in FIG. 1.

FIG. 9 shows the results of the evaluation described above with reference to FIG. 5 to FIG. 8 performed for all rows and columns. It will be known from FIG. 9 that both marks and spaces are preferably separated into the above three or more groups, 3T, 4T, and 5T or longer, for determining first pulse movement.

Last pulse movement varies according to the mark length and immediately following space. For the same reasons that apply to the first pulse, last pulse movement is preferably determined based on the same three or more groupings, that is, 3T, 4T, and 5T or longer, of marks and spaces described above.

It is to be noted that when measurement results are substantially equal, such as from 5T to 11T, in adjacent cells in the maps shown in FIG. 9, those cells are grouped together. This makes it possible to reduce the scale of the pulse moving circuit 110.

As will be known from the above description, by focusing on the difference in size resulting from specific mark/space combinations, and placing combinations where the space length is 3T or 4T into a group separate from combinations where the space length is 5T or longer, this preferred embodiment of the invention can control first pulse movement and last pulse movement according to the mark/space pattern, and can thereby achieve recording with little jitter.

In addition, by focusing on the difference in size resulting from specific mark/space combinations, and placing combinations having a space length of 3T and combinations having a space length of 4T into separate groups, this preferred embodiment of the invention can control first pulse movement and last pulse movement according to the mark/space pattern.

The properties of the reproduction equalizer 114 are a second factor. Reproduction equalizer 114 properties depend on such factors as the beam spot size and shortest mark length. The beam spot size is determined by the wavelength of the semiconductor laser 103 and the aperture of the objective lens 106.

A method of grouping marks and spaces in order to change first pulse movement and last pulse movement due to this second factor is described next below with reference to FIG. 10.

Figure 10:
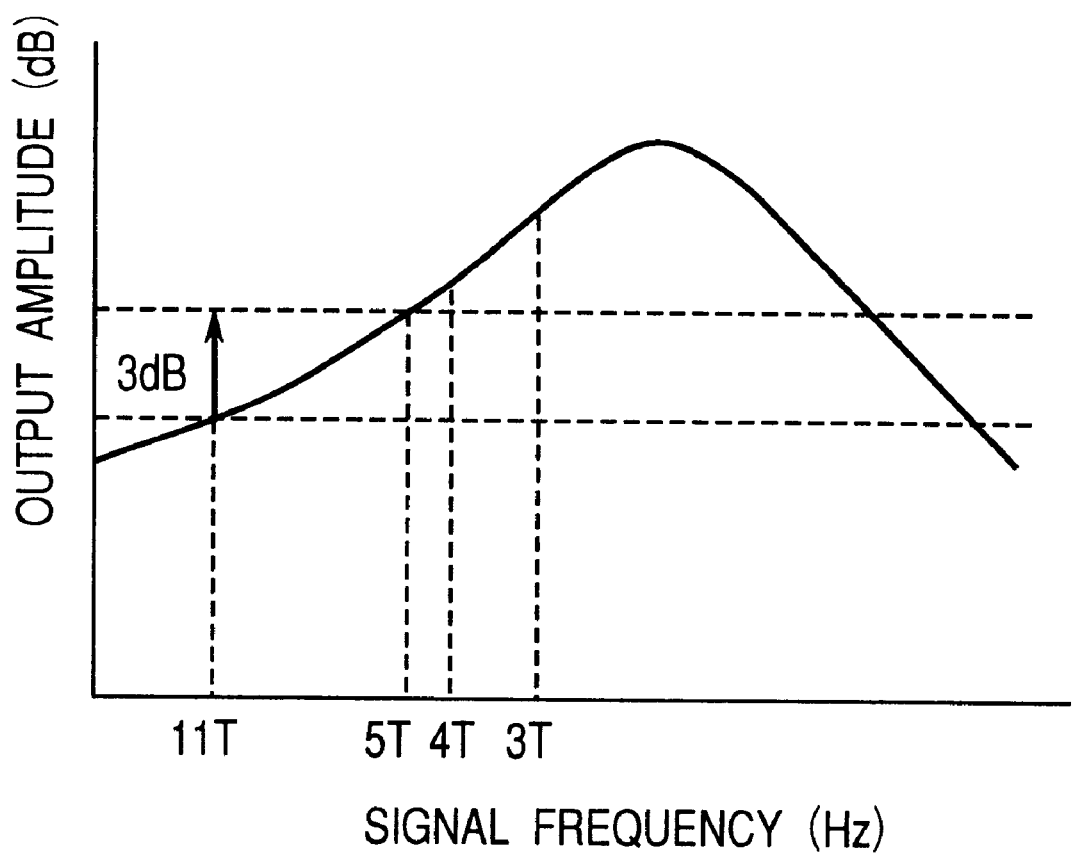
FIG. 10 is a frequency characteristic diagram for a reproduction equalizer in the first embodiment shown in FIG. 1.

FIG. 10 is a typical graph of the frequency characteristic of the reproduction equalizer 114. This shows the amplitude ratio of the equalizer output signal to the input signal, signal frequency is shown on the horizontal axis, and output amplitude is shown on a logarithmic scale on the vertical axis. The frequency of 3T, 4T, 5T, and 11T signals is shown along the horizontal axis. Note that the frequency of a 3T signal is high, the marks recorded and reproduced for a 3T signal are therefore small, and the amplitude of the reproduced optical signal is therefore low. Equalizer characteristics are therefore set to increase the output amplitude to compensate for this attenuation of the optical frequency characteristic. This can be accomplished by using a high pass filter or a bandpass filter with a peak at a frequency slightly higher than 3T, with or without an amplifier used in combination.

The slope of the curve, that is, the difference in the output amplitude of a high frequency signal in which mark or space length is 3T, and the output amplitude of a low frequency signal in which mark or space length is 11T, increases as the shortest mark length decreases. As a result, the difference between, for example, the output amplitude at a frequency of 5T and the output amplitude at a frequency of 11T, also increases.

If marks for which the difference in output amplitude is great are included in the same group when separating the marks for changing first and last pulse movement, reproduction equalizer 114 properties prevent correct edge position reproduction even if the first and last pulses are recorded to specifically eliminate the effects of heat accumulation in the recording film and thermal interference.

It is therefore preferable for the difference in the output amplitude characteristic of the reproduction equalizer 114 to be as small as possible for all marks in the same group.

It is further preferable for the ratio between the output amplitude of the reproduction equalizer 114 at the frequency of the longest mark to the output amplitude of the reproduction equalizer 114 at the frequency of the shortest mark in the plurality of marks in the same group to be 3 dB or less. This value, 3 dB or the square root of 2, is relatively commonly used when working with frequency characteristics.

In other words, regardless of frequency, when signals of the same amplitude are input, the amplitude ratio of the input signal and output signal from the equalizer will always be a difference equal to the square root of 2. By controlling the output amplitude ratio to 3 dB or less as a threshold value for grouping signals together as in this preferred embodiment of the invention, distortion error introduced by the equalizer during reproduction is reduced, and recording and reproducing with less jitter can be achieved.

It is to be noted that in mark edge recording using a semiconductor laser 103 with a 650 nm wavelength, an objective lens 106 with an aperture of 0.6, a shortest mark length of 0.595 µm, and (2,10) run-length limited modulation, marks shorter than 5T, that is, 3T and 4T marks, are preferably not included in the same group as 11T marks. Further considering the size of the pulse moving circuit 110, 5T and longer marks, or 6T and longer marks, are preferably included in the same group. In this exemplary embodiment, T is approximately 30 ns, 3T is approximately 90 ns, and 11T is approximately 330 ns.

A third factor is the scale of the pulse moving circuit 110 and the desired precision with which pulse movement is determined, and the limited scale of the pattern signal generator 125 and memory 127.

Based on the above described first and second factors, marks or spaces with a great difference in heat accumulation or thermal interference are placed into different groups, and marks resulting in a significantly different output amplitude from the reproduction equalizer are also placed in different groups. However, the number of storage registers increases as the number of groups increases, and this increases the scale of the pulse moving circuit 110. In addition, if the number of registers is increased, the number of patterns used for determining the values stored to the registers also increases, and the scale of the pattern signal generator 125 therefore also increases. Yet further, the time required to set the registers increases whether the register values are set at the factory or by the end user, and the recording track space required for setting the registers also increases.

It is therefore desirable to minimize the number of groups used for determining first and last pulse movement.

By grouping marks of 5T and longer in the same group as described according to this preferred embodiment, the scale of the pulse moving circuit 110, and the scale of the pattern signal generator 125, can both be minimized.

Although determining the optimum grouping of marks and spaces is affected by several factors, the three factors described above are considered in particular to determine the group types shown in FIG. 4 in the present embodiment.

It is to be noted that a predetermined initial value is set as shown in FIG. 4 (b) before pattern signal recording. These initial values can be separately determined from experience, or they can be all set to the same value. If the same initial value is used for all, the value, for example, 1 ns, stored for the first pulse movement in a 5S5M pattern in the left table in FIG. 4 (b), for example, is preferably stored for all patterns. In the case of the right table in FIG. 4 (b), the value stored for 5M5S is used. Note, further, that in this case the value set for the 5S5M pattern is determined so that the time between first pulse 301 and multiple pulses 302 is 0.5T as shown in FIG. 3, and the value set for 5M5S is determined so that the time between multiple pulses 302 and last pulse 304 is 0.5T.

It will also be obvious that the values set for 5S5M and 5M5S can also be determined using other methods. An example is shown in FIG. 28.

As shown in FIG. 28, the pattern signal 2801 of the pattern signal generator 125 in this example has a single period of 6T. Also shown are output signal 2802 from the pulse generator 111, output signal 2803 from the pulse moving circuit 110, and marks 2804 formed in the recording track of the optical disk 101 as a result of modulating laser power output between peak power and bias power levels according to output signal 2803. It is to be noted that while signals 2801, 2802, and 2803 are not generated on the same time base, for convenience they are shown with corresponding parts in each signal aligned vertically.

The pattern signal 2801 in this case represents marks and spaces with a simply repeating 6T period, and thus contains types 5S5M and 5M5S of the eighteen pattern types shown in FIG. 4 (a). The laser is then driven based on drive signal 2803 in FIG. 28 to record the marks 2804. In this exemplary embodiment, pattern signal 2801 in FIG. 28 is repeatedly recorded around one complete circumference of the recording track. When this track is recorded, it is then reproduced. Reproduction includes converting an optical signal from the photodetector 108 to an electrical signal, and then processing this electrical signal with preamp 112, low pass filter 113, and reproduction equalizer 114. The reproduction signal 2805 from the reproduction equalizer 114 is applied to an asymmetry measuring circuit 130 and a digitizing circuit 115. The digitizing circuit 115 adjusts the slice level signal 2809 so that the output level corresponding to a mark and the output level corresponding to a space in the output signal of the digitizing circuit are at equal intervals, and applies this slice level signal 2809 to the asymmetry measuring circuit 130.

The asymmetry measuring circuit 130 compares the average of the high 2811 and low 2810 peak values of the reproduction signal 2805 with the slice level signal 2809. When the difference therebetween is a predefined level or greater, the lengths of the marks 2804 and spaces are not equal. This difference is attributable to a shift in the first pulse and last pulse positions. Initial movement values 5S5M0 and 5M5S0 are therefore corrected according to the sign of the difference so that, for example, the first pulse and last pulse each move the same time-base distance in opposite directions. The corrected values are then overwritten to memory 127.

It is to be noted that the stored movement values are corrected and overwritten to 5M5S and 5S5M using a single feedback loop (through 110, 109, 108, 112, 115, 120, 126) in the above exemplary embodiment. It will be obvious, however, that a plurality of feedback loops can be alternatively used. As a result, 5S5M and 5M5S values whereby 6T marks can be recorded at the correct length can be obtained. By thus correcting the physical length of a mark used as a reference, marks in other groups can also be recorded at the correct length, and recording with less jitter can be achieved.

The output signal 203 from the pulse moving circuit 110 is input to the laser drive circuit 109 whereby laser power is modulated so that the laser emits at peak power while the output signal 203 is high, and emits at bias power while the signal is low, to form a mark sequence 204 as shown in FIG. 2.

During reproduction, the collimator lens 104 converts the laser beam emitted from the semiconductor laser 103 to parallel light, which is then incident on the beam splitter 105. Light passing the beam splitter 105 is focused to a light spot by the objective lens 106, and emitted to the optical disk 101.

Light reflected from the optical disk 101 is then collected by the objective lens 106, and passed back to the beam splitter 105. Light reflected by the beam splitter 105 is collected by collective lens 107, and focused on photodetector 108.

The photodetector 108 converts light incident thereon to an electrical signal, which is then amplified by the preamp 112. The output signal from the preamp 112 is then passed through the low pass filter 113 whereby high frequency signal components are blocked. The reproduction equalizer 114 then equalizes the signal, which is next binarized by the digitizing circuit 115 using a predetermined slice level. A reproduction signal 205 converted to a sequence of 0s and 1s is thus output from the digitizing circuit 115 to the pulse position offset measuring circuit 120. The pulse position offset measuring circuit 120 measures the specific edge intervals 221, 222, 223, and 224 in the reproduction signal 205.

If the measured edge interval 221 in FIG. 2 is longer than the normal 9T interval, the setting for last pulse movement 3M5S in FIG. 4 (a) is reduced by the difference between the measured interval 221 and the normal 9T interval from the current setting of 3M5S0 by way of bus 126. The setting for first pulse movement 5S3M in FIG. 4 (a) is similarly increased from the current 5S5M0 setting by the difference between the edge interval 222 and the normal 9T interval by way of bus 126 if the edge interval 222 is longer than the normal 9T interval. The values stored for 4S5M and 5M4S are likewise corrected based on the measured edge intervals 223 and 224.

When these four settings are updated, the first pattern signal 201 is again recorded and the edge intervals are measured. This process is repeated until the difference between the normal interval and the measured edge interval is below a predetermined threshold level simultaneously for all four edge intervals. Note that when measuring the edge intervals, the edge that is not moved is the falling edge of 6T mark 209, and the immediately following space is 6T space 210, in the case of edge interval 221, for example. In the case of edge interval 222, the rising edge of 6T mark 213 is not moved, and the immediately preceding space is 6T space 212.

The mark and space between which are located the edge that is not moved within a mark/space pattern are referred to herein as a reference signal. This edge is further referred to as the reference edge. If the reference edge moves in conjunction with an edge that is moved, movement settings cannot be correctly determined because there is no fixed point of reference. The position of the reference edge must therefore must remain stationary and cannot move in conjunction with the edge that is moved.

Furthermore, even when the edge in the reference signal does not change in conjunction with an edge that is moved, it may be necessary to change the reference signal so that the reference edge does not move in conjunction with the shifted edge. For example, if the reference signal includes a mark of the shortest possible length, it is necessary to change the reference signal so that the reference signal edge does not change at any of the movement settings defined for the shortest marks. Considering the potential for setting variations, the reference marks are preferably fixed.

If the reference signal is included in the same group as the longest signal, the same reference signal can be used for all settings shown in FIG. 4 (a), and mark start and end positions can be more accurately determined in various mark/space combinations.

Though small, there are also differences in the change of the mark edge position even in the longest signal group because of differences in heat accumulation and thermal interference within the group for changing first pulse and last pulse movement. However, by selecting as the reference signal a mark/space signal with a high frequency of occurrence that also belongs to the group containing the longest possible signal as in this preferred embodiment of the invention, an overall reduction in the occurrence of imprecise edge positions can be achieved.

Furthermore, though small there are also differences in the output amplitude of the reproduction equalizer when reproducing different mark/space signals in the group containing the longest possible mark because of differences in the output amplitude of the reproduction equalizer 114 within the group for changing first pulse and last pulse movement. However, by selecting as the reference signal a mark/space signal with a high frequency of occurrence that also belongs to the group containing the longest possible signal as in this preferred embodiment of the invention, the occurrence of imprecise edge positions can be reduced in the overall recording and reproducing system.

By thus achieving an overall reduction in the occurrence of edges at imprecise positions, the probability of reliable error correction by the demodulation and error correction circuit 117 during actual data recording is improved.

It is to be noted that the frequency of signal occurrence increases and the output amplitude of the reproduction equalizer increases as signal length decreases. Selecting the reference mark therefore involves a trade-off between the frequency of occurrence and the output amplitude. Furthermore, while marks and spaces of 5T or longer are in the same signal group in this preferred embodiment of the invention, a 6T reference mark is used in consideration of the reproduction equalizer characteristics.

It is to be further noted that the initial values set for 3S3M0 and 3M3S0 are selected so that the reference marks will be recorded with the correct length. Different initial values can, however, be used based on the structure of the optical disk 101.

When recording the first pattern signal is completed, a second pattern signal is recorded. Shown in FIG. 11 are second pattern signal 1101, which is the output signal from the pattern signal generator 125, output signal 1102 from the pulse generator 111, output signal 1103 from the pulse moving circuit 110; and mark pattern 1104 formed in the recording track of the optical disk 101 based on output signal 1103. The first pulse settings 5S4M and 3S5M, and last pulse settings 4M5S and 5M3S in FIG. 4 (a) are then updated using the same method described above using the first specific pattern signal 201.

When recording the second pattern signal is completed, a third pattern signal is recorded. Shown in FIG. 12 are third pattern signal 1201, which is the output signal from the pattern signal generator 125, output signal 1202 from the pulse generator 111, output signal 1203 from the pulse moving circuit 110, and mark pattern 1204 formed in the recording track of the optical disk 101 based on output signal 1203. In FIG. 12, the 10T period of 1210 and 1211 (a 6T space and 4T mark) and the 10T period of 1212 and 1213 (a 4T mark and 6T space) have the same time length and appear as a continuous wave. Measured signal 1210–1211 and the next measured signal 1212–1213 therefore have the same length, and it is difficult to accurately separate and measure the measured signals. Utilizing the fact that jitter is minimized if the two 10T periods are substantially the same length, a jitter meter can therefore be substituted for measurement. Other than these signal periods, the same method used with the first pattern is applied to set and update the first pulse settings 4S4M and 3S3M, and last pulse settings 4M4S and 3M3S in FIG. 4 (a).

When recording the third pattern signal is completed, a fourth pattern signal is recorded. Shown in FIG. 13 are fourth pattern signal 1301, which is the output signal from the pattern signal generator 125, output signal 1302 from the pulse generator 111, output signal 1303 from the pulse moving circuit 110, and mark pattern 1304 formed in the recording track of the optical disk 101 based on output signal 1303. The first pulse setting 4S3M and last pulse setting 4M3S in FIG. 4 (a) are updated using the same method used with the first pattern signal.

When recording the fourth pattern signal is completed, a fifth pattern signal is recorded. Shown in FIG. 14 are fifth pattern signal 1401, which is the output signal from the pattern signal generator 125, output signal 1402 from the pulse generator 111, output signal 1403 from the pulse moving circuit 110, and mark pattern 1404 formed in the recording track of the optical disk 101 based on output signal 1403. The first pulse setting 3S4M and last pulse setting 3M4S in FIG. 4 (a) are updated using the same method used with the fourth pattern signal.

It is therefore possible with the method according to this preferred embodiment to compensate during recording for the effects of heat accumulation and thermal interference during recording and distortion from the equalizer during reproduction, and thus record a mark/space pattern with little jitter, by determining the mark start position from the length of the recorded mark and the length of the space preceding the mark, and determining the mark end position from the length of the recorded mark and the length of the space following thereafter.

In addition, by recording first to fifth patterns and compensating the mark start and end positions to minimize the offset from a specific reference edge and the normal mark length, optimum first pulse and last pulse movement can be determined for any signal pattern not contained in the first to fifth patterns. It is therefore possible to record marks at the correct position during actual data recording, and recording with little jitter can thus be achieved.

It should also be noted that the method according to this preferred embodiment uses simple symbol patterns whereby the difference DSV is controlled to substantially zero only when DSV is not 0. As noted above, DSV is the difference between the reference signal, measured signal, and marks and spaces in a specific period.

For example, the sum of marks in the first pattern signal 201 in FIG. 2 is 34T and the sum of spaces is also 34T. By incorporating into one pattern two types of measured marks with different edge intervals, the settings shown in FIG. 4 (a) can be determined using fewer patterns. It is also possible to minimize the time and recording track space, and the scale of the pattern signal generator 125, needed to determine the settings.

As described above, the pulse position offset measuring circuit 120 measures the position offset of the output signal from the digitizing circuit 115 to detect the edge interval or jitter interval, modifies the table stored in memory 127 based on the measured results, and sends a signal indicative of the corrected pulse edge position to the pulse moving circuit 110 to shift the first pulse and last pulse.

It is alternatively possible, however, to pass the output signal from the digitizing circuit 115 over a general purpose interface bus (GPIB) to a timer interval analyzer or other analyzer for measuring the time interval or jitter, further connect the time interval analyzer over a GPIB to a personal computer, and then pass signals from the personal computer to the pulse moving circuit 110 through a SCSI or other bus interface. In this case it is not necessary for the recording device to comprise the pulse position offset measuring circuit 120, and can thus be simplified.

It is to be noted that while this preferred embodiment shifts the first pulse and last pulse according to the specific mark/space combination, the same method can be applied to optimize the pulse width in a recording method whereby the pulse width of the first pulse and last pulse are modified.

Figure 22:
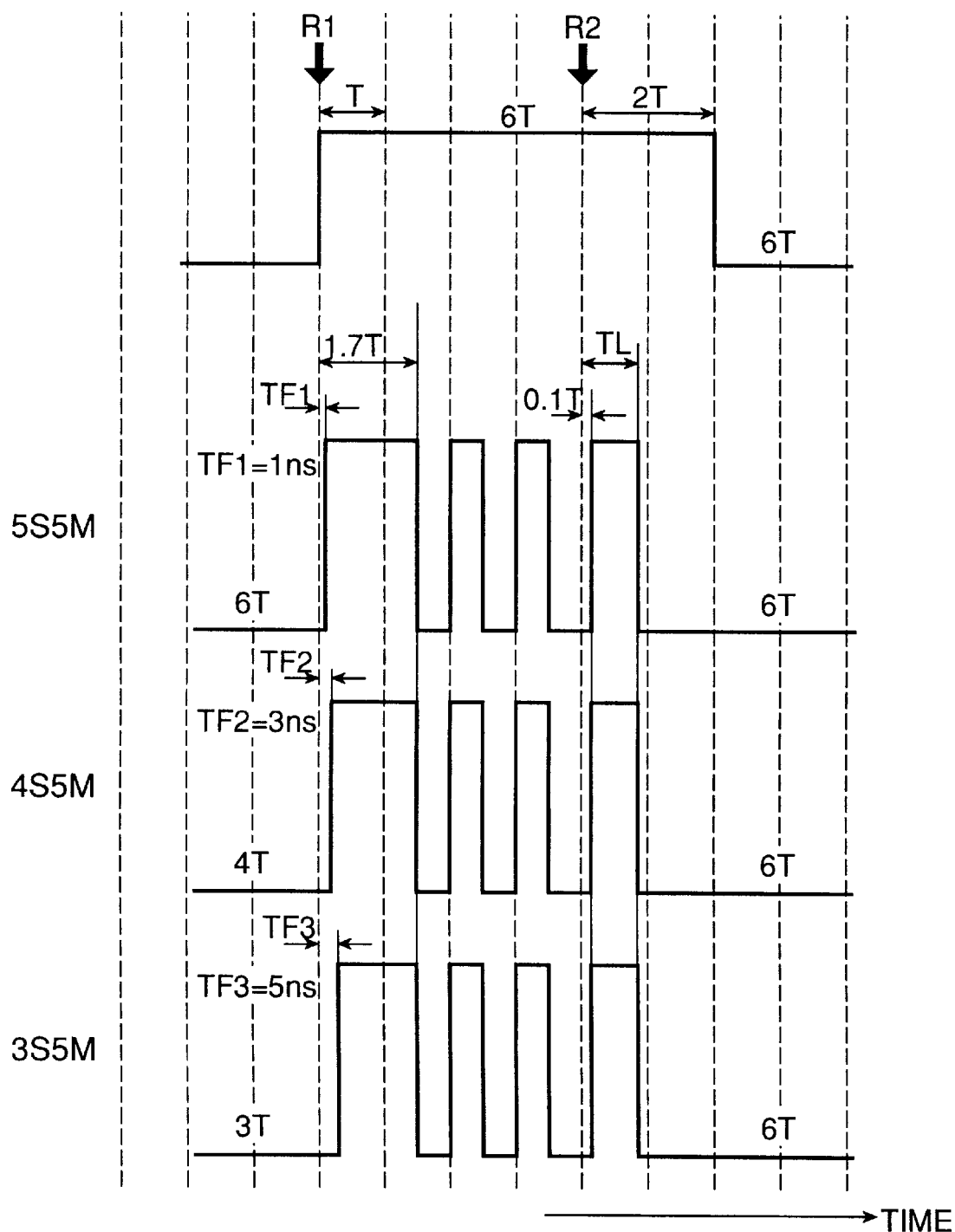
FIG. 22 is a waveform diagram for describing first pulse width adjustment according to the present invention.

FIG. 22 shows the signal parts corresponding to 6T mark 213 in first pattern signal 201 and 6T mark 213 in pulse generator output signal 202 in FIG. 2 when the space length before the 6T mark is 6T, 4T and 3T according to an alternative method of the present embodiment whereby optimization is achieved by pulse width modification.

The width of the first pulse changes according to the length of the mark and the preceding space. In this preferred embodiment, both marks and spaces are separated into three groups of 3T, 4T, and 5T or longer, and the mark edge movement is therefore defined for nine possible combinations of marks and spaces.

Movement of the rising edge of the first pulse is expressed as movement TF referenced to the rising edge of first pattern signal 201, for example. The falling edge of the first pulse does not move. 6T mark 213 belongs to the 5S5M group because the preceding space is 6T long, and TF1 is approximately 1 ns. When the preceding space is 4T long, movement of the rising edge of the first pulse is in the 4S5M group, and TF2 is approximately 3 ns. When the preceding space is 3T long, the first pulse width is in the 3S5M group, and TF3 is approximately 5 ns. Note that while the value of TF changes, the falling edge of the first pulse does not move. As a result, the width of the first pulse changes.

Figure 23:
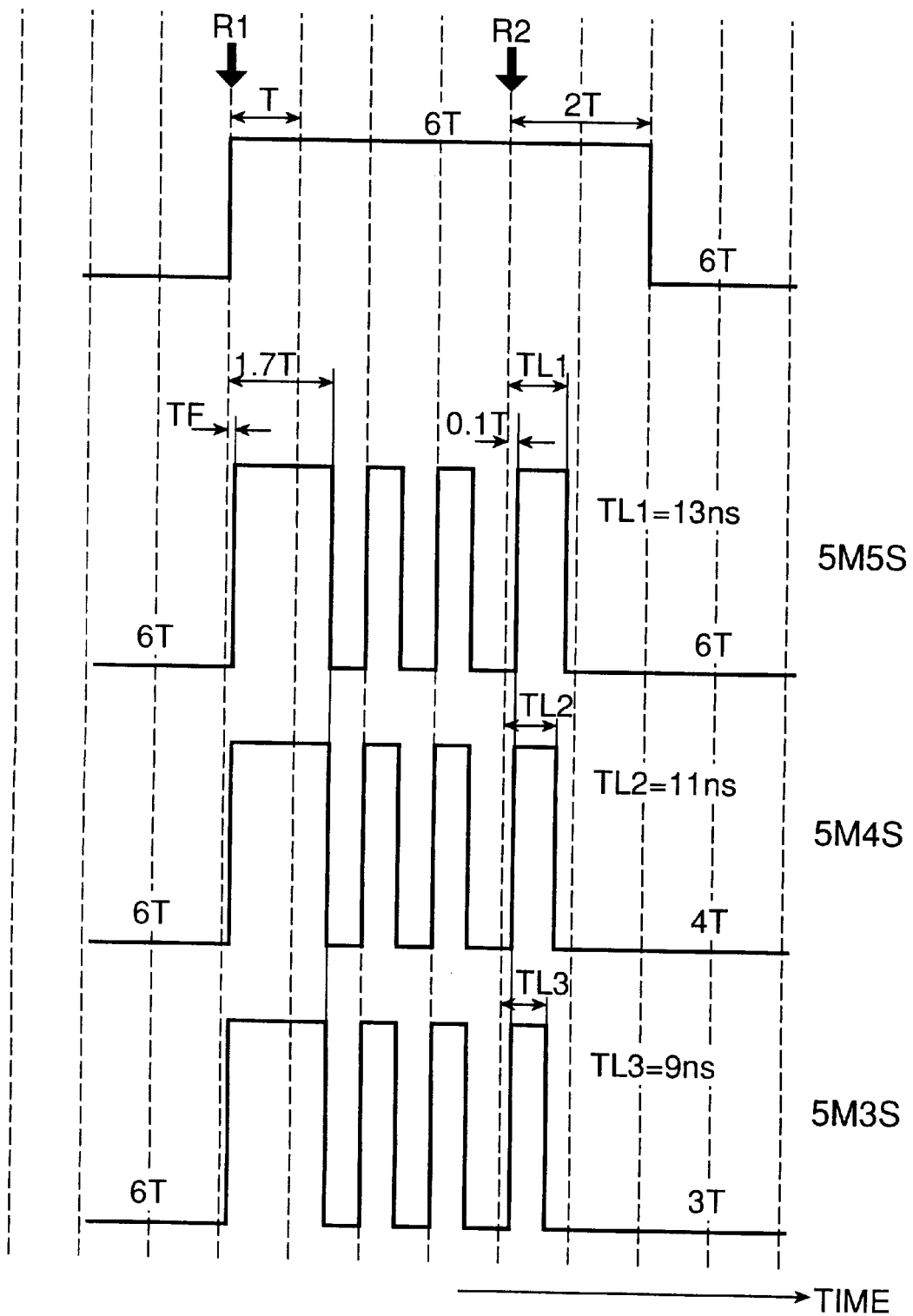
FIG. 23 is a waveform diagram for describing last pulse width adjustment according to the present invention.

FIG. 23 shows the signal parts corresponding to 6T mark 213 in first pattern signal 201 and 6T mark 213 in pulse generator output signal 202 in FIG. 2 when the space length before the 6T mark is 6T, 4T and 3T according to a further alternative method of the present embodiment whereby optimization is achieved by pulse width modification.

In this case, movement of the rising edge of the last pulse is expressed as TL referenced, for example, to two clocks before the falling edge of the first pattern signal 201. The falling edge of the last pulse does not move. Because the following space is 6T long, 6T mark 213 is in the 5M5S group, and TL1 is approximately 13 ns. When the following space is 4T, movement of the rising edge of the last pulse is in the 5M4S group, and TL2 is approximately 11 ns. When the following space is 3T, the last pulse width group is 5M3S, and TL3 is approximately 9 ns. Note that while the value of TL changes, the rising edge of the last pulse does not change. As a result, the width of the last pulse changes.

It is to be noted that various methods other than changing the pulse position or pulse width can be used for controlling the mark start and mark end positions, including adjusting the laser power at a specific pulse. Using the TF and TL value tables to achieve the intended optimized recording benefits of the present invention therefore requires that the optimization method used to correct these tables be recorded with the tables. This can be accomplished by recording the control method or by recording a predetermined code indicative of the control method.

Figure 15:
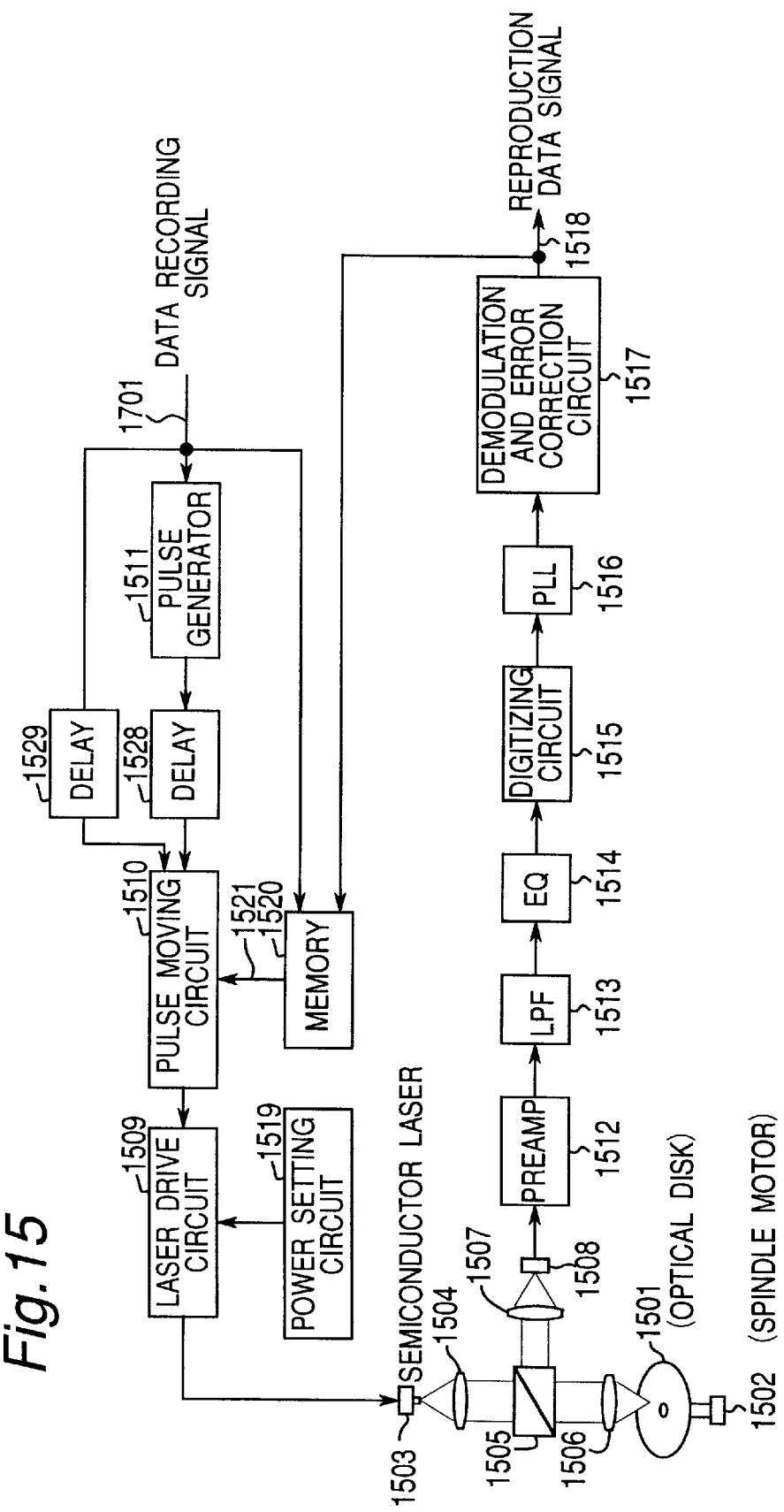
FIG. 15 is a block diagram of an optical data recording device according to a second embodiment of the present invention.

A data recording medium and optical data recording method according to alternative embodiments of the present invention are described next with reference to the accompanying diagrams. FIG. 15 is a block diagram of a data recording medium and optical data recording device according to a second preferred embodiment of the present invention. Shown in FIG. 15 are: an optical disk 1501, spindle motor 1502, semiconductor laser 1503, collimator lens 1504, beam splitter 1505, objective lens 1506, collective lens 1507, photodetector 1508, laser drive circuit 1509, pulse moving circuit 1510, delay circuits 1528 and 1529, pulse generator 1511, preamp 1512, low pass filter 1513, reproduction equalizer 1514, digitizing circuit 1515, PLL 1516, demodulation and error correction circuit 1517, reproduction data signal 1518, power setting circuit 1519, and memory 1520.

Figure 16:
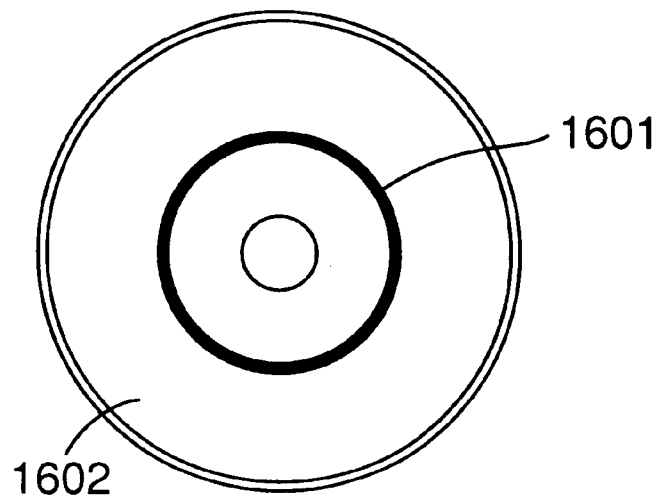
FIG. 16 is a plan view of a data recording medium in the second embodiment shown in FIG. 15.

FIG. 16 is a plan view of the optical disk 1501. In this exemplary embodiment, the optimum position information for the mark start and end positions, that is, the two corrected tables shown in FIG. 4 (a) and determined as described in the first embodiment of the present invention, is stored in recording area 1601. These tables comprise pit and land or mark and space bit sequences printed to the inside circumference area of the disk by the disk manufacturer prior to shipping. These two corrected tables are compiled by the manufacturer of the optical disk, and are prestored to every optical disk. The end-user thus obtains optical disks to which these two corrected tables have already been stored, and uses such disks with the device shown in FIG. 15.

The optical data recorder shown in FIG. 15 has an optical head comprising semiconductor laser 1503, collimator lens 1504, beam splitter 1505, objective lens 1506, collective lens 1507, and photodetector 1508. When an optical disk 1501 is loaded into this optical data recorder and the recorder completes a specific operation for recognizing the disk, the optical head moves to the recording area 1601 storing the optimum mark start and end position data tables, and reads the stored information. The data read from recording area 1601 thus contains the information compiled in the two tables shown in FIG. 4 (a), and the reproduced tables are thus stored to memory 1520.

Mass manufacturing optical disks thus containing the corrected tables described above is described next below.

Two corrected tables, such as shown in FIG. 4 (a) are first compiled by determining the optimum mark start and end positions using a method such as described in the above first exemplary embodiment of the present invention. The content of these tables is then recorded to the recording area 1601 of the optical disk 1501 using a laser to cut the information into the master that will be used for stamping the optical disk 1501 during production when the recording area 1601 is recorded with a pit and land sequence.

FIG. 27 shows a mastering system for cutting an optical disk master. Shown in FIG. 27 are memory 2701, adjustment method data generator 2702, recording signal generator 2703, light modulator 2704, beam generator 2705, lens assembly 2706, glass master 2708 coated with a photosensitive material 2707, turntable 2709, and motor 2710.

The two corrected tables shown in FIG. 4 (a) are stored to the memory 2701 in FIG. 27. Next, the method used for adjusting the first and last pulses is output from the adjustment method data generator 2702, and the content of the two tables is then output from memory 2701. The recording signal generator 2703 then processes the adjustment method and table data, including modulation, adding an error correction code, scrambling, and other desired processes, and generates the two-value data used for recording. The laser beam generated from the solid laser generator 2705, which oscillates at the wavelength of ultraviolet or the like wavelength, is power modulated by the output signal from the recording signal generator 2703. The modulated laser beam is fed through the lens assembly and impinges onto the photosensitive material 2707 on the glass master 2708. Recording the two-value signal is achieved at this time by turning the laser beam on and off to expose or not expose the photosensitive layer appropriately. It is to be noted that the two tables stored to the memory 2701 are recorded to an area on the inside circumference side of the user data area where the end user records data, and the adjustment method data is recorded to the area to the inside circumference side of the area to which the two tables are stored.

The area exposed by an ultraviolet laser is then melted and a metal stamping master with pits and lands is produced by sputtering the glass substrate with nickel or metal. This metal stamping master is used as a die for producing a disk substrate on which a recording film is formed. A single disk is produced by combining two substrates, at least one of which has a recording film formed thereon.

Returning to FIG. 15, the laser beam emitted from the semiconductor laser 1503 is converted to parallel light by the collimator lens 1504, and passed to the beam splitter 1505. Light passing the beam splitter 1505 is collected by the objective lens 1506, and emitted to the optical disk 1501 as a light spot.

Light reflected from the optical disk 1501 is then collected by the objective lens 1506, and passed again through the beam splitter 1505. Light reflected from the beam splitter is collected by the collective lens 1507, and focused on the photodetector 1508.

The photodetector 1508 converts the light quantity to an electrical signal, which is amplified by the preamp 1512. The output signal from the preamp 1512 is then passed through the low pass filter 1513 whereby high frequency signal components are blocked. The reproduction equalizer 1514 then equalizes the signal, which is next binarized by the digitizing circuit 1515 using a predetermined slice level to output a signal of 0s and 1s. The clock of the output signal from the digitizing circuit 1515 is extracted by the PLL 1516. An output signal synchronized to the clock is then supplied to the demodulation and error correction circuit 1517 for demodulation and error correction of correctable data, resulting in the reproduction signal 1518.

The reproduction signal 1518, that is, the content of the two tables and the adjustment method information, is then stored to memory 1520. The optimum movement information for the mark start and end positions is then passed over bus 1521 to the pulse moving circuit 1510.

During actual recording, the power setting circuit 1519 sets the laser drive circuit 1509 to either peak power or bias power level. Subsequent signal flow is described further below with reference to FIG. 17.

Figure 17:
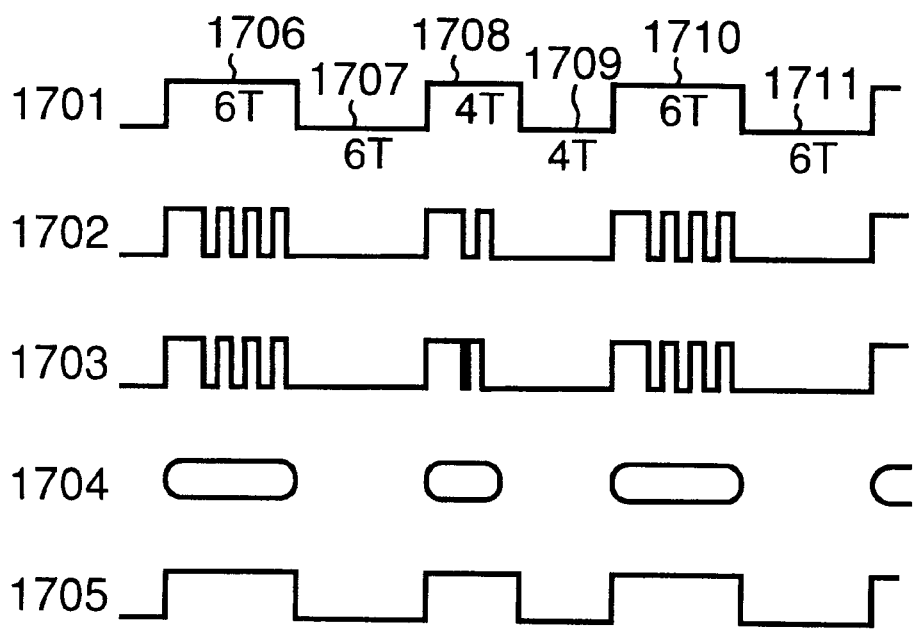
FIG. 17 illustrates signals used in the second embodiment shown in FIG. 15.

Shown in FIG. 17 are the data recording signal 1701 input to the pulse generator 1511, the output signal 1702 from the pulse generator 1511, and the output signal 1703 from the pulse moving circuit 1510. The recording marks 1704 are formed in the recording track of the optical disk 1501 by modulating laser power between peak power and bias power levels. Note that signals 1701, 1702, and 1703 are not actually on the same time axis, but are shown with corresponding parts aligned vertically in FIG. 17 for ease of understanding only.

In the data recording signal 1701, mark parts 1706, 1708, and 1710 are the parts of the signal whereby a mark is formed on the disk, and space parts 1707, 1709, and 1711 are the parts of the signal that appear as a space on disk.

For example, when data generated by (2,10) run-length limited modulation is recorded using a mark edge recording method, the marks and spaces have a shortest length of 3T and a longest length of 11T where T is the reference period. Mark part 1706 is a 6T mark, space 1707 is a 6T space, 1708 is a 4T mark, 1709 is a 4T space, 1710 is a 6T mark, and 1711 is a 6T space.

This data recording signal 1701 is converted to a pulse sequence by the pulse generator 1511, resulting in the output signal 1702. Pulse output from the pulse generator 1511 corresponding to marks of lengths 3T to 11T is shown in FIG. 18.

Figure 18:
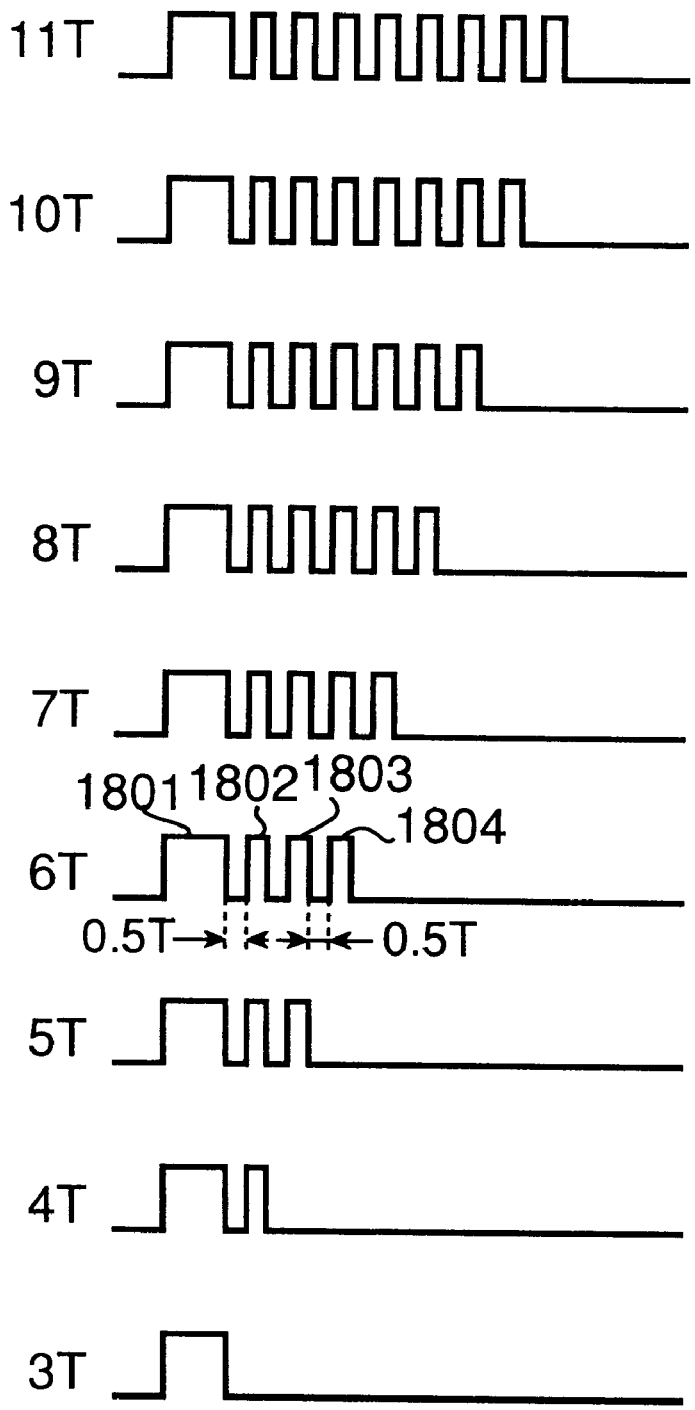
FIG. 18 illustrates recording pulse sequences in the second embodiment shown in FIG. 15.

Referring, by way of example, to a 6T signal in FIG. 18, the pulse at the start of the signal is referred to as the first pulse 1801, and the pulse at the end of the signal is the last pulse 1804. The pulses between the first pulse 1801 and last pulse 1804 are referred to as multiple pulses 1802 and have a constant period.

In a 6T mark there are two multiple pulses 1802, in a 7T mark there are three, and in a 5T mark there is one. It will thus be obvious that the number of multiple pulses 1802 between the first and last pulses increases by one with each 1T increase in signal length, and decreases one with each 1T decrease in signal length. A 4T mark, therefore comprises only the first and last pulses, and has no multiple pulses 1802 therebetween. In addition, a 3T mark comprises one pulse.

It is to be noted that in this preferred embodiment the time-base length of the first pulse is 1.5T, the last pulse is 0.5T, and the length of the multiple pulses is also 0.5T. The invention shall not be so limited, however, and the length of these pulses can be varied as necessary according to the structure of the optical disk 1501.

As noted above, data recording signal 1701 and output signal 1702 are not on the same time base. However, the difference between the rising edge of the data recording signal 1701 and the rising edge of the first pulse of the output signal 1702 is the same for any particular mark parts, and the difference between the falling edge of the data recording signal 1701 and the failing edge of the last pulse of the output signal 1702 is also the same for any particular mark parts.

The pulse generator output signal 1702 is input to the pulse moving circuit 1510, which generates and outputs a signal 1703 in which the positions of the first pulse and last pulse are moved. FIG. 19 shows the tables stored to memory 1520.

It is to be noted that the tables in FIG. 19 are identical to the tables shown in FIG. 4 (*a*), and show the combinations of marks and spaces used for shifting the first pulse and last pulse positions.

The position of the first pulse changes according to the length of the mark and the immediately preceding space. In this preferred embodiment, the marks and spaces are separated into three groups, that is, 3T, 4T, and 5T or longer. A total of nine different last pulse positions are therefore defined.

Movement of the last pulse position is similarly corrected. That is, the last pulse position movement changes according to the mark length and the length of the following space. In this exemplary embodiment marks and spaces are separated into three groups based on length, 3T, 4T, and 5T or longer, and pulse position movement is defined for each of the nine possible mark/space combinations. The last pulse movement TL is then calculated using the same method used to calculate first pulse movement TF as described in the first embodiment.

The output signal 1703 from the pulse moving circuit 1510 is input to the laser drive circuit 1509, which produces a laser beam at peak power at high pulses and at bias power at low pulses in the output signal 1703. The resulting sequence of marks 1704 is shown in FIG. 17.

It is therefore possible to reproduce from a predetermined area on the optical disk and store in the optical data recorder data for changing mark start and end positions according to a data signal input to the optical data recorder for recording. As a result, it is possible for the optical data recorder to optimally record a signal of marks and spaces even using optical disks having different disk structures and recording films.

It is to be noted that it is not necessary to obtain the optimized mark start and end position information recorded to a particular area of the disk for all disks. More specifically, if the variation between disks is small, the values obtained for disks of the same structure and same recording film composition can be recorded as typical optimized values.

Furthermore, when the optimized mark start and end position values are obtained again during actual recording to further improve jitter, the time required for the optimization process can be reduced if typical optimized values are prerecorded to a particular area of the disk as in this exemplary embodiment, and these typical values are used as default values for obtaining mark start and end position values optimized for jitter.

Furthermore, while marks and spaces are separated into three groups, 3T, 4T, and 5T or longer, in this preferred embodiment, the method for determining these groupings is the same as in the first embodiment above. Insofar as the optimized values for first and last pulse movement are recorded to disk, various other groupings can be used according to particular conditions. For example, four groups, such as 3T, 4T, 5T, and 6T or longer, could be alternatively used.

Tables for pulse movement groupings based on mark and space lengths of 3T, 4T, 5T, and 6T or longer are shown in FIG. 24. Increasing the number of length groups used makes it possible to more precisely control first pulse movement and last pulse movement according to the specific symbol pattern recorded, and thus enables recording with even less jitter.

It is to be noted that this preferred embodiment of the present invention determines and stores optimized movement information for both first and last pulses, but the invention shall not be so limited. Recording optimized movement information for only one of the pulses is still beneficial for determining the optimum pulse movement, and makes it possible to achieve recording with little jitter.

It will also be obvious to one with ordinary skill in the related art that while this exemplary embodiment has been described recording first and last pulse movement information optimized for particular mark and space combinations, a recording method whereby the pulse width of the first pulse and last pulse is change can be alternatively used as described in the first embodiment. Optimized recording of mark and space sequences can be achieved even with different types of optical disks, such as when the disk structure or recording film is different, by prerecording optimized pulse width information to a particular area of the disk.

It is to be noted that various methods other than changing the pulse position or width can be used for controlling the mark start and end positions, including changing laser emission power at a particular pulse. Using the TF and TL value tables to achieve the intended optimized recording benefits of the present invention therefore requires that the optimization method used to correct these tables be recorded with the tables.

Figure 25:
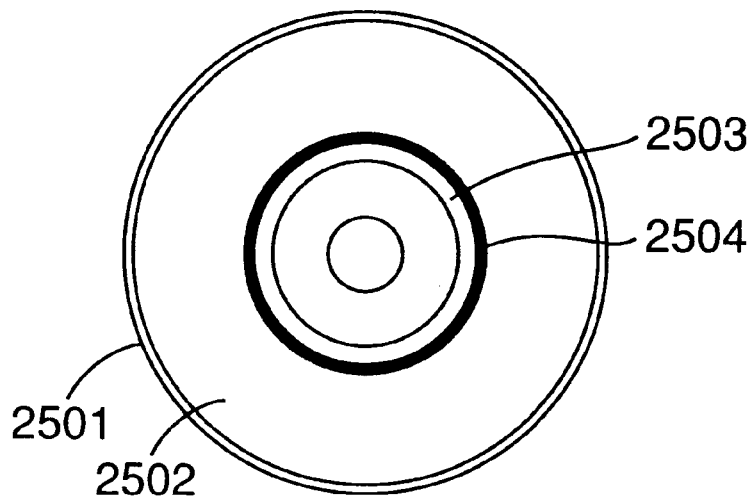
FIG. 25 is a plan view of a data recording medium according to the present invention.

FIG. 25 is a plan view of an optical disk 2501. In this exemplary embodiment user data is recorded to data area 2502. Information indicative of the method used to adjust the first pulse and last pulse according to the input data signal is recorded to area 2503 at the inside-most circumference area of the disk using a sequence of pits and lands (marks and spaces). The optimized or typical mark start and end position information, that is, tables such as shown in FIG. 4 (a) or FIG. 24, is recorded to area 2504 using a sequence of pits and lands (marks and spaces).

It is therefore possible to know, by reproducing the data stored to area 2503, what method is used for adjusting the marks and spaces, that is, whether the first or last pulse is moved or whether the pulse width is changed.

It is to be noted that variables introduced by the recording device, such as the shape of the laser spot emitted to the disk, can also cause the optimum position of the mark start and end positions required for the best recording results to vary. To compensate for this, the optimized or typical position information recorded to a particular area of the disk during disk manufacture can be reproduced and these initial values used for a recording test whereby the position values are optimized for the recording device.

This makes it possible to reduce the number of patterns that must be recorded to determine the optimum mark start and end positions for actual data recording. It also reduces the time required for this optimization procedure.

Figure 26:
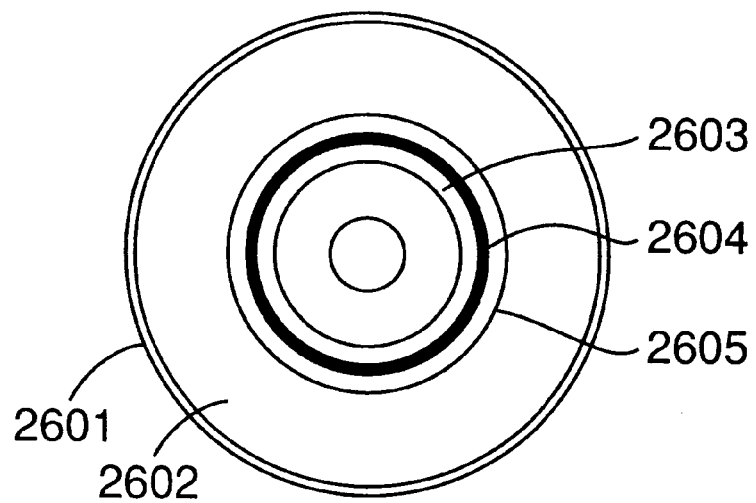
FIG. 26 is a plan view of a further data recording medium according to the present invention.

FIG. 26 is a plan view of a further optical disk 2601. In this exemplary embodiment user data is recorded to data area 2602. Information indicative of the method used to adjust the first pulse and last pulse according to the input data signal is recorded to area 2603 at the inside-most circumference area of the disk using a sequence of pits and lands (marks and spaces). The optimized or typical mark start and end position information is recorded to area 2604 using a sequence of pits and lands (marks and spaces). In addition, this optical disk 2601 comprises a test recording area 2605.

With an optical disk 2601 thus comprised, the optimization method is read from area 2603, and the mark start and end position information is read from area 2604, and based on this information a test recording is made in area 2605 using a method such as described in the first embodiment of the present invention. This makes it possible to achieve more optimized recording than is possible using only the settings prerecorded to the disk.

It should be noted that by recording the area 2503 or 2603 containing the method used for adjusting the first pulse and last pulse to the inside circumference side of the area 2504 or 2604 to which the optimized or typical mark start and end position information is recorded during disk manufacture as shown in FIG. 25 or FIG. 26, respectively, the recording method can be quickly determined when reproduction proceeds from the inside circumference area of the disk, and the time required to complete any settings that are dependent upon the recording method can be reduced.

It will also be obvious to one with ordinary skill in the related art that while the preferred embodiments of the present invention have been described. above using an optical disk by way of example, the invention shall not be so limited. More specifically, the same benefits can be achieved using a tape or card type recording medium or recording and reproducing device without departing from the scope of the accompanying claims.

It will thus be known from the above that an optical data recording device according to the present invention records first to fifth patterns of exemplary recording symbol sequences, and then reproduces these patterns to determine the optimum movement of the first and last pulses. These optimized first and/or last pulse movement values are then recorded to the recording medium during production. As a result, when an end user records information to the recording medium, this information can be reproduced to reduce or eliminate the time and effort required for the recording device to learn the optimum movement information. Marks can therefore be recorded with higher precision, and recording with little jitter can be achieved.

Furthermore, optimized recording can be achieved even with different types of optical disks, that is, optical disks having different disk structures or recording film compositions, using a data recording medium according to the present invention by recording to a particular area of the data recording medium information indicative of the change in the mark start and end positions required for input data signals of different symbol patterns, and then reproducing and storing this information in the recording device at the time of data recording.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A data recording medium having a plurality of tracks for recording information represented as marks and spaces between the marks in a data recording area of the data recording medium, the marks being formed by an optical beam modulated by one or a plurality of drive pulses comprising a first pulse, a last pulse and one or more multiple pulses between the first and last pulses, where a number of the drive pulses is determined according to a length of a mark part in the input signal to be recorded on the track, said data recording medium comprising:

a control information recording area storing:

first pulse movements (TF) for modifying the first pulse of the drive pulses, said first pulse movements (TF) being separated at least into nine groups determined by a combination of three groups of different lengths of a mark and three groups of different lengths of a space immediately preceding the mark, the three groups of different mark lengths being a group with only the first pulse, a group with the first pulse and the last pulse, and a group with the first pulse, the multiple pulse and the last pulse, wherein said first pulse movements (TF) indicate either a pulse shift amount for shifting the first pulse without changing a pulse width, or a pulse width amount for changing the pulse width of the first pulse; and a code indicating a method for using said first pulse movements (TF) either as the pulse shift amount or as the pulse width amount.

2. The data recording medium as set forth in claim 1, wherein said first pulse movements TF are expressed as a time difference TF between a first reference point R1, which is a leading edge of a mark part in the original signal to be recorded, and a first edge of the first pulse in the plurality of drive pulses.

3. The data recording medium as set forth in claim 1, wherein the length of mark parts in the original signal and the length of space parts between the mark parts are expressed as a value NT wherein:

T is a reference period; and

N is a positive integer from n1 to n2;

mark and space parts are separated into a plurality of groups according to the mark length and space length; and a specific first pulse movement TF is set for each group.

4. The data recording medium as set forth in claim 3, wherein n1 is 3 and n2 is 11.

5. The data recording medium as set forth in claim 3, wherein mark parts are separated by length into three groups of 3T, 4T, and 5T or longer marks, and space parts are separated by length into three groups of 3T, 4T, and 5T or longer spaces.

6. The data recording medium as set forth in claim 3, wherein mark parts are separated by length into four groups of 3T, 4T, 5T, and 6T or longer marks, and space parts are separated by length into four groups of 3T, 4T, 5T, and 6T or longer spaces.

7. The data recording medium as set forth in claim 1, wherein mark parts are separated by length into four groups, and space parts are separated by length into four groups.

8. The data recording medium as set forth in claim 1, wherein the separation of groups becomes fine as a length of the mark part and a length of the space part decreases.

9. A recording and reproducing apparatus for recording and reproducing a data recording medium having a plurality of tracks for recording information represented as marks and spaces between the marks in a data recording area of the data recording medium, the marks being formed by an optical beam modulated by one or a plurality of drive pulses comprising a first pulse, a last pulse and one or more multiple pulses between the first and last pulses, where a number of the drive pulses is determined according to a length of a mark part in the input signal to be recorded on the track, said data recording medium comprising:

a control information recording area storing:

first pulse movements (TF) for modifying the first pulse of the drive pulses, said first pulse movements (TF) being separated at least into nine groups determined by a combination of three groups of different lengths of a mark and three groups of different lengths of a space immediately preceding the mark, the three groups of different mark lengths being a group with only the first pulse, a group with the first pulse and the last pulse, and a group with the first pulse, the multiple pulse and the last pulse, wherein said first pulse movements (TF) indicate either a pulse shift amount for shifting the first pulse without changing a pulse width, or a pulse width amount for changing the pulse width of the first pulse; and a code indicating a method for using said first pulse movements (TF) either as the pulse shift amount or as the pulse width amount;

said apparatus comprising:

device operable to reproduce the first pulse movements (TF) and the code from the data recording medium;

device operable to store the reproduced first pulse movements (TF) and the code;

device operable to generate a drive pulse based on a data recording signal, and correct the generated drive pulse based on the first pulse movements (TF) and the code;

device operable to emit an optical beam based on the corrected drive pulses to form spaces and marks on the data recording medium.

10. The recording and reproducing apparatus as set forth in claim 9, wherein the first pulse movements (TF) are set with respect to a class of combinations of mark lengths and space lengths, and wherein said device operable to reproduce comprises an equalizer, and a ratio between an output amplitude of said equalizer at a frequency of the longest mark and an output amplitude of said equalizer at the frequency of the shortest mark is 3 dB or less, provided that the longest mark and the shortest mark are from the same classification.

11. The recording and reproducing apparatus as set forth in claim 10, wherein the first pulse movements (TF) are set with respect to the type of the recording film composition changes.

12. The recording and reproducing apparatus as set forth in claim 10, wherein the first pulse movements (TF) are set with respect to the disk structure or recording film composition.

13. The recording and reproducing apparatus as set forth in claim 9, wherein the first pulse movements (TF) are set with respect to the type of the recording film composition changes.

14. The recording and reproducing apparatus as set forth in claim 13, wherein the first pulse movements (TF) are set with respect to the disk structure or recording film composition.

15. The recording and reproducing apparatus as set forth in claim 9, wherein the first pulse movements (TF) are set with respect to the disk structure or recording film composition.

16. A data recording medium having a plurality of tracks for recording information represented as marks and spaces between the marks in a data recording area of the data recording medium, the marks being formed by an optical beam modulated by one or a plurality of drive pulses comprising a first pulse, a last pulse and one or more multiple pulses between the first and last pulses, where a number of the drive pulses is determined according to a length of a mark part in the input signal to be recorded on the track;
characterized by a control information recording area storing:
   first pulse movements (TF) for modifying said first pulse of said drive pulses, said first pulse movements (TF) being separated at least into nine groups determined by a combination of three groups of different length of a mark and three groups of different length of a space immediately preceding said mark, the three groups of different mark length being a group with only the first pulse, a group with the first pulse and the last pulse, and a group with the first pulse, the multiple pulse and the last pulse, wherein said first pulse movement (TF) indicates either a pulse shift amount for shifting said first pulse without changing the pulse width, or a pulse width amount for changing the pulse width of said first pulse; and
   a code indicating a method for using said first pulse movement (TF) either as a pulse shift amount or as a pulse width amount.

17. The data recording medium as set forth in claim 16, wherein the first pulse movement TF is expressed as a time difference TF between a first reference point R1, which is a leading edge of a mark part in the original signal to be recorded, and a first edge of the first pulse in a plurality of drive pulses.

18. The data recording medium as set forth in claim 16, wherein the length of mark parts in the original signal and the length of space parts between the mark parts are expressed as a value NT where:
   T is a reference period; and
   N is a positive integer from n1 to n2;
   mark and space parts are separated into a plurality of groups according to mark and space length; and
   specific first pulse movement TF is set for each group.

19. The data recording medium as set forth in claim 18, wherein n1 is 3 and n2 is 11.

20. The data recording medium as set forth in claim 18, wherein mark parts are separated by length into three groups of 3T, 4T, and 5T or longer marks, and space parts are separated by length into three groups of 3T, 4T, and 5T or longer spaces.

21. The data recording medium as set forth in claim 18 wherein mark parts are separated by length into four groups of 3T, 4T, 5T, and 6T or longer marks, and space parts are separated by length into four groups of 3T, 4T, 5T, and 6T or longer spaces.

22. The data recording medium as set forth in claim 16, wherein mark parts are separated by length into four groups, and space parts are separated by length into four groups.

23. The data recording medium as set forth in claim 16, wherein the separation of groups becomes fine as a length of the mark part and a length of the space part decreases.

24. A recording and reproducing apparatus for recording and reproducing a data recording medium as claimed in claim 16;
said apparatus comprising:
   means for reproducing said first pulse movements (TF) and the code from said data recording medium;
   means for storing the reproduced first pulse movements (TF) and the code;
   means for generating a drive pulse based on a data recording signal, and correcting the generated drive pulse based on the first pulse movements (TF) and the code; and
   means for emitting an optical beam based on the corrected drive pulses to form spaces and marks on the data recording medium.

25. The recording and reproducing apparatus as set forth in claim 24, wherein said first pulse movement (TF) is set with respect to a class of combinations of mark lengths and space lengths, and wherein the reproducing means comprises an equalizer, and the ratio between the output amplitude of the equalizer at the frequency of the longest mark and the output amplitude of the equalizer at the frequency of the shortest mark is 3 dB or less, provided that the longest mark and the shortest mark are from the same classification.

26. The recording and reproducing apparatus as set forth in claim 25, wherein said first pulse movements (TF) is set with respect to the type of the recording film composition changes.

27. The recording and reproducing apparatus as set forth in claim 25, wherein said first pulse movements (TF) being set with respect to the disk structure or recording film composition.

28. The recording and reproducing apparatus as set forth in claim 24, wherein said first pulse movements (TF) is set with respect to the type of the recording film composition changes.

29. The recording and reproducing apparatus as set forth in claim 28, wherein said first pulse movements (TF) being set with respect to the disk structure or recording film composition.

30. The recording and reproducing apparatus as set forth in claim 24, wherein said first pulse movements (TF) being set with respect to the disk structure or recording film composition.

* * * * *